(12) United States Patent
Heintzmann et al.

(10) Patent No.: US 8,405,059 B2
(45) Date of Patent: Mar. 26, 2013

(54) METHOD AND APPARATUS FOR IMPROVING THE RESOLUTION AND/OR SECTIONING ABILITY OF AN IMAGING SYSTEM

(75) Inventors: Rainer W Heintzmann, London (GB); Kai Wicker, London (GB)

(73) Assignee: King's College London, London (GB)

( * ) Notice: Subject to any disclaimer, the term of this patent is extended or adjusted under 35 U.S.C. 154(b) by 708 days.

(21) Appl. No.: 12/525,435

(22) PCT Filed: Feb. 1, 2008

(86) PCT No.: PCT/GB2008/000338
§ 371 (c)(1),
(2), (4) Date: Nov. 19, 2009

(87) PCT Pub. No.: WO2008/093099
PCT Pub. Date: Aug. 7, 2008

(65) Prior Publication Data
US 2010/0059696 A1    Mar. 11, 2010

(30) Foreign Application Priority Data

Feb. 2, 2007 (GB) .................... 0702051.4
Jun. 27, 2007 (GB) .................... 0712518.0

(51) Int. Cl.
*G02B 27/42* (2006.01)
(52) U.S. Cl. .............. 250/550; 356/458; 356/463
(58) Field of Classification Search .......... 356/457, 356/458, 463, 464, 511, 512, 489, 495; 250/550–554
See application file for complete search history.

(56) References Cited

U.S. PATENT DOCUMENTS

| 5,064,286 | A | 11/1991 | Ai et al. | |
| 2004/0145745 | A1 | 7/2004 | Voelkl | |
| 2006/0072118 | A1* | 4/2006 | Chan et al. | 356/495 |
| 2007/0195330 | A1* | 8/2007 | Ohashi et al. | 356/498 |

FOREIGN PATENT DOCUMENTS

| EP | 0 486 050 B1 | 2/1998 |
| EP | 1 524 491 A1 | 4/2005 |
| JP | 06026830 | 2/1994 |
| WO | WO2007/141409 | 5/2007 |

OTHER PUBLICATIONS

Increasing The Lateral Resolution In Confocal Fluorescence And Bio-Luminescence Microscopes, Sandeau et al., Focus on Microscopy 2007, Spain, Apr. 2007.

(Continued)

*Primary Examiner* — Francis M Legasse, Jr.
(74) *Attorney, Agent, or Firm* — Carmody & Torrance LLP

(57) ABSTRACT

Embodiments of the invention allow the operation of confocal microscopes with relatively open pinholes (e.g. 1 Airy unit) whilst still giving a significant XY resolution improvement. In addition axial (Z) discrimination or resolution may also be improved. This is achieved by splitting the emitted light path in an interferometric fashion. One of the split beams is then directed to an image transformation system, which may perform an image inversion which inverts at least one coordinate in image space. The transformed beam and the non-transformed beam are then recombined in an interferometric fashion (i.e. coherently added), which provides an interference effect resulting in increased resolution of the image. Where the embodiments are being used in a confocal application, the resulting combined beam can then be subject to a spatially discriminating means, such as a pinhole, or the like.

55 Claims, 18 Drawing Sheets

OTHER PUBLICATIONS

Lateral resolution enhancement in confocal self-interference microscopy, Kang et al., Proc. Of SPIE, vol. 5701, pp. 152-163, 2005.

Interferometric resolution improvement for confocal microscopes, Wicker et al., Optics Express, vol. 15, No. 19, Sep. 2007.

Increasing the lateral resolution of 4Pi fluorescence microscopes, Sandeau et al., Optical Socieity of America, vol. 23, No. 5, pp. 1089-1095, May 2006.

Arrangement of a 4Pi microscope for reducing the confocal detection volume with two-photon excitation, Sandeau et al., Science Direct, Optics Communications, vol. 264, pp. 123-129, 2006.

Visible Cone-Beam Tomography With a Lensless Interferometric Camera, Marks et al., Science, vol. 284, pp. 2164-2166, Jun. 1999.

* cited by examiner

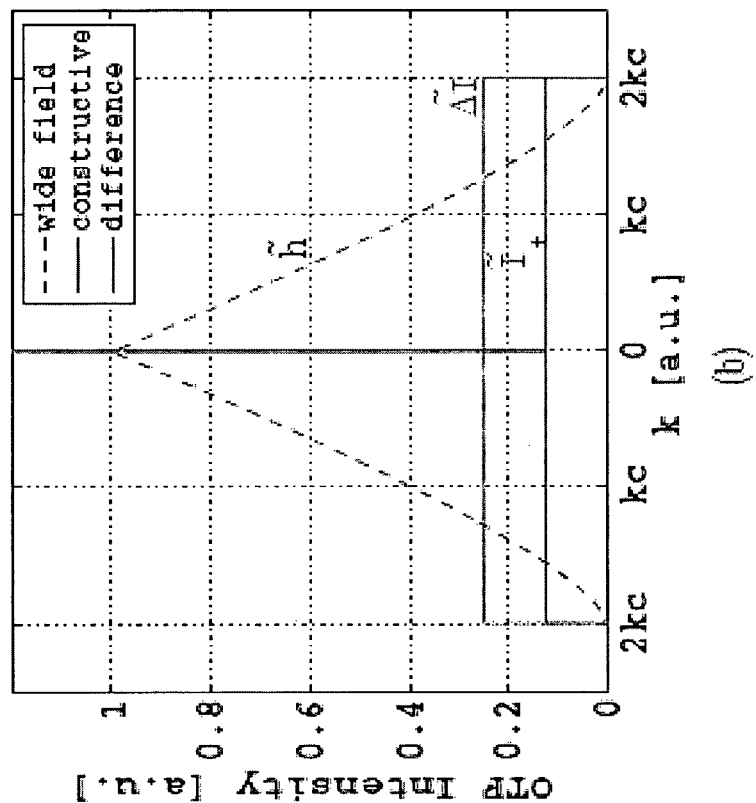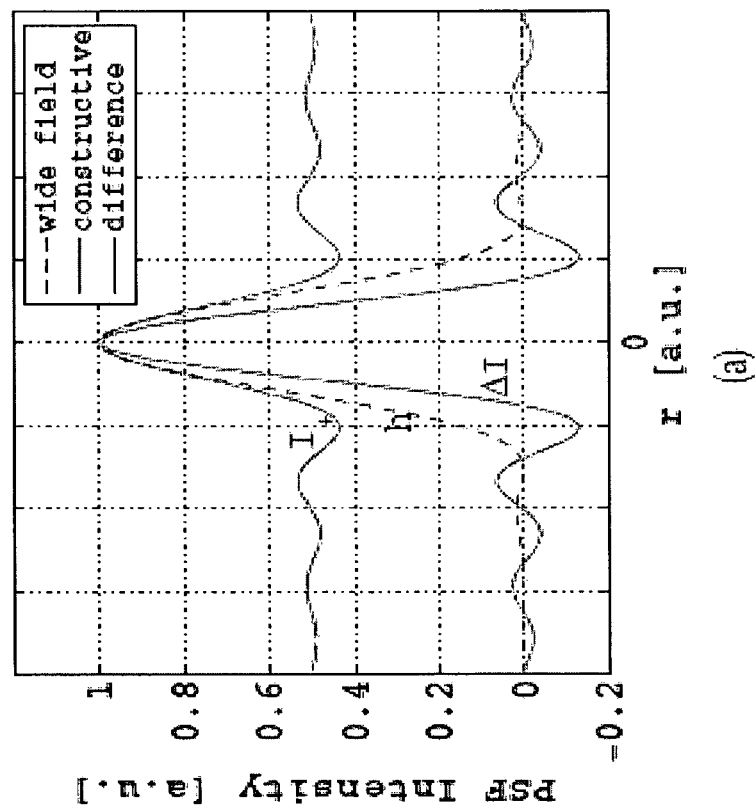
Figure 17

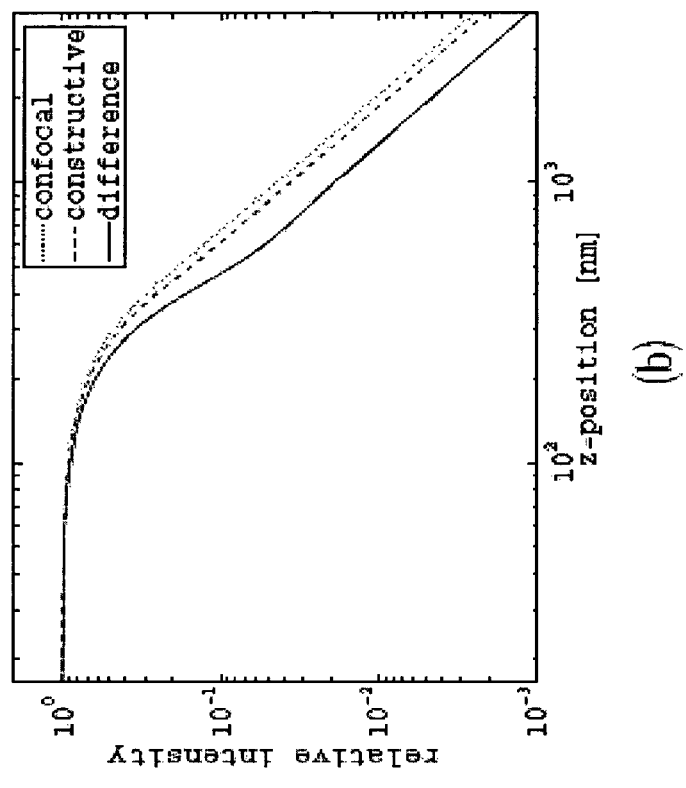
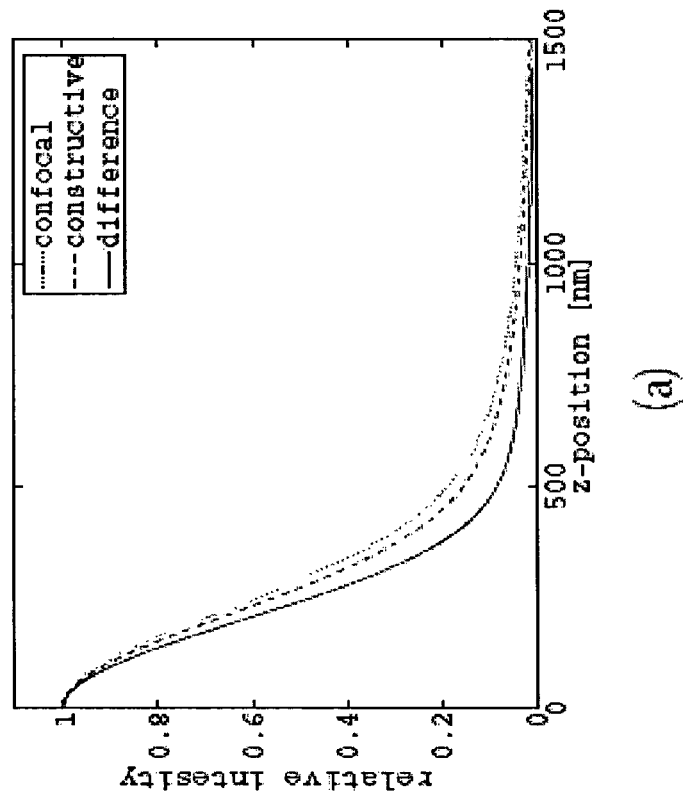
Figure 19

METHOD AND APPARATUS FOR IMPROVING THE RESOLUTION AND/OR SECTIONING ABILITY OF AN IMAGING SYSTEM

CROSS REFERENCE TO RELATED APPLICATIONS

This application is a National Stage of International Application No. PCT/GB08/00338, filed Feb. 1, 2008, now pending, the subject matter of which is herein incorporated by reference in its entirety.

TECHNICAL FIELD

The present invention relates to a method and an apparatus which improve the resolution obtainable from imaging systems which use wave-based information carriers. In particular the present invention relates to a method and apparatus which employ interferometric techniques to achieve an increase in the resolution obtainable from the imaging system without sacrificing image brightness.

BACKGROUND TO THE INVENTION

Laser scanning confocal microscopes have been known for many years, and provide the ability to image a relatively narrow focal plane within a sample. By then adjusting the position of the microscope with respect to the sample so as to take a slightly different focal plane, a "stack" of optically sectioned images can be obtained at different positions through the sample, thus allowing a three-dimensional image of the sample to be built up. An example laser scanning confocal microscope is shown in FIG. 5.

Here, a light source in the form of a laser beam 12 passes a light source aperture 14 and then is focused by an objective lens 18 into a small (ideally diffraction-limited) focal volume on a focal plane 20 within a fluorescent specimen 22. A mixture of emitted fluorescent light 24 as well as reflected laser light from the illuminated spot is then recollected by the objective lens 18. A dichroitic beam splitter 16 separates the light mixture by allowing only the laser light to pass through and reflecting the fluorescent light 24 into the detection apparatus. After passing a pinhole 26 the fluorescent light is detected by a photo-detection device 28 (photomultiplier tube (PMT) or avalanche photodiode) transforming the light signal into an electrical one which is recorded by a computer (not shown).

The detector aperture obstructs the light that is not coming from the focal point, as shown by the light gray dotted line 30 in FIG. 5. The out-of-focus points are thus doubly suppressed: firstly they are less illuminated, and secondly most of their returning light is blocked by the pinhole. This results in sharper images compared to conventional fluorescence microscopy techniques and permits one to obtain images of various z axis planes (z-stacks) of the sample.

The detected light originating from an illuminated volume element within the specimen represents one pixel in the resulting image. As the laser scans over the plane of interest a whole image is obtained pixel by pixel and line by line, while the brightness of a resulting image pixel corresponds to the relative intensity of detected fluorescent light. The beam is scanned across the sample in the horizontal plane using one or more (servo-controlled) oscillating mirrors. In comparison to the alternative, which is sample scanning, this scanning method usually has a low reaction latency. The scan speed can be varied. Slower scans provide a better signal to noise ratio resulting in better contrast and higher resolution. As mentioned, information can be collected from different focal planes e.g. by raising or lowering the microscope stage. The computer can then generate a three-dimensional picture of a specimen by assembling a stack of these two-dimensional images from successive focal planes.

In order to obtain clearer and more detailed images it is desirable to try and increase the resolution of a confocal microscope. State of the art confocal systems achieve an increase in lateral (X-Y) resolution when the pinhole 26 is almost completely closed (e.g. <0.3 Airy units (AU)). However, such a technique leads to a severe loss in detected light intensity, whereas in microscopy and especially in fluorescence microscopy, the amount of detected light is precious.

In order to increase the amount of light available for imaging, therefore, within a typical application of a confocal laser scanning microscope for fluorescence detection the pinhole is opened to a diameter of >1 AU. Unfortunately, this then leads to a loss of resolution improvement along the in-plane (X-Y) directions, making the resolution of a confocal microscope with such a wide aperture of the pinhole almost identical to the X-Y resolution of a standard widefield microscope.

To overcome these conflicting problems it would be desirable to provide a technique which allows for the use of relatively wide pinholes (>0.3 AU), whilst preventing the attendant deleterious effects on the microscope resolution.

PRIOR ART

Sandeau, N., and Giovannini, H. in *Increasing the lateral resolution of 4Pi fluorescence microscopes* J. Opt. Soc. Am., Vol. 23, No. 5 pp. 1089-1095, May 2006, (hereafter Ref. 1) and also in *Arrangement of a 4Pi microscope for reducing the confocal detection volume with two-photon excitation* Optics Communications 264 (2006) pp. 123-129 (hereafter Ref 2) describe a resolution enhancing technique that can be used with a particular type of microscope known as a 4Pi microscope. Generally, within a 4Pi microscope a sample is illuminated from two sides by two objectives, and the emitted light collected by the two objectives.

In order to improve the lateral resolution of the 4Pi microscope, Sandeau et al propose a configuration of the 4Pi microscope in which the amount of interference of the two emitted beams from each objective depends on the displacement of the luminophore in the sample in a plane perpendicular to the optical axis. In this case, the total intensity on the photodetector resulting from the coherent superposition of the two emitted beams depends on the distance d between the luminophore and the optical axis. This system, which Sandeau et al. call the 4Pi' microscope, is a 4Pi microscope in which an image inversion system has been added in one arm of the interferometer, as shown in FIG. 1. The image inversion system modifies the symmetry of the optical conjugations in a manner that will be discussed below.

Sandeau et al. report that the rules of geometrical optics show that the 4Pi' microscope is equivalent to a system in which two beams are emitted by two coherent sources that are symmetric with respect to the focus. FIG. 2 illustrates the scheme of the sensor head equivalent to a 4Pi microscope and to a 4Pi' microscope, and in particular uses a dipole source to show the symmetries obtained with the two arrangements.

Within FIG. 2 the following applies: F is the common focus of the two microscope objectives O1 and O2 of FIG. 1; PL refers to the image forming lens in front of the pinhole. OA is the optical axis in the object (or image) space of the system in FIG. 1; D is the image of a dipole emitter via the non-inverting path of a 4Pi' microscope or the first of two paths in the standard 4Pi microscope; the corresponding dipole moves in the vicinity of the focal plane FP; ID is the image of the dipole through the second path of a 4Pi microscope (like in FIG. 1 but without the image inversion system); ID' is the image of D through the inverting path in the 4Pi' microscope (as shown in FIG. 1). In this representation, the two beams emitted by the dipole pass through PL and are superimposed on the detector to form the respective images D and ID for the 4Pi microscope or D and ID' in case of the 4Pi' microscope. FIG. 2(a) shows a view in a plane containing the optical axis (z direction), whereas FIG. 2(b) shows the corresponding view in a plane orthogonal to the optical axis.

From FIG. 2 one can see that, in a standard 4Pi microscope, the two images of a source are symmetric with respect to the focal plane. In the 4Pi' microscope, when the dipole moves in a direction perpendicular to the optical axis, the presence of the image inversion system modifies the symmetry of the optical conjugations. In this case the 4Pi' microscope is equivalent to a system in which two mutually coherent images are formed, being symmetric with respect to the nominal focus F of the image inversion system. The two emitted beams are coherently added on the detector (4Pi type C). The output signal is proportional to the mean absolute square of the summed (complex valued) amplitudes on the photodetector. Image D and ID' ideally overlap for the position F (which should also correspond to the nominal focus of the illuminating beam) and constructively interfere to yield a maximum signal. When the distance between the luminophore and the optical axis increases, D and ID' separate laterally giving rise to partially destructive interference, which rapidly lowers the signal. Thus Sandeau et al. report that one can expect a collection efficiency function (CEF) with a 4Pi' microscope to be different from the CEF obtained with a 4Pi microscope. The results given by Sandeau et al. in the first of the papers referenced above, and reproduced in FIGS. 3 and 4, show that the CEF of the 4Pi' microscope is substantially reduced in width in the lateral direction when compared to the 4Pi microscope (see FIG. 3), and improves further when the numerical aperture of the objective lenses is increased (see FIG. 4).

However, 4Pi microscopes are relatively rare, being expensive to buy and maintain. Therefore, Sandeau et al.'s work in the context of the 4Pi microscopes, whilst interesting, does not solve the problem faced by many research labs worldwide, of how to improve the resolution of the more standard and (in comparison to the 4Pi microscope) common confocal microscope or widefield microscope.

Other prior art is also known, as briefly discussed next.

Firstly, beam inverting optics are commonly used in theodolites. The typical arrangement for these instruments are three mutually orthogonal reflecting surfaces. The same principle is used in "Catseyes" retroreflectors.

Inverting interferometers are also known from literature. In Gates & Bennett (1968), J. Scientific Instruments (J. Phys. E) 1, 1171-1174, the use of a simple interferometer in which one beam is inverted is described for the purpose of using it for beam alignment. The described confocal interferometer has the drawback of having very unequal optical pathlength and thus requiring a very long coherence length to observe interference effects. A possible use of such a device for imaging applications (e.g. in scanning mode) is not mentioned in the stated publication, nor is it discussed that the total intensity on the output side can vary in dependence of the source position.

The concept of shift interferometry and rotational shift interferometry (RSI) is known from astronomy. Recently these concepts have been applied to lensless imaging in D. L. Marks, R. A. Stack, D. J. Brady, D. C. Munson Jr., R. B. Brady, "Visible Cone-beam tomography with a lenseless interferometric camera", Science 284, 2164-2166 (1999). In RSI the image plane is usually very distant from the detector position and the required data. RSI serves to measure the mutual coherence function in astronomy, but can also serve to reconstruct images with the help of a Fourier transformation. RSI does not make use of the fact that the on-axis position can yield completely uniform (e.g. constructive) interference, whereas off-axis positions yield non-uniform coherence and thus lose light to the other path of the interferometer. Instead RSI measures the pattern and deduces image information from the observed interference pattern with the help of a computational Fourier transformation.

Moreover, in a similar context J. D. Armitage Jr. and A. Lohmann "Rotary shearing interferometry", Optical Acta 12, 185-192 (1965) describe several shearing interferometers. In shearing interferometers the detector is positioned always in a plane conjugate to the aperture plane (related by a Fourier-transformation to the image plane). There is no image plane beyond the exit beam splitter of the interferometer. An image plane close to the detector would pose problems to conventional RSI. Furthermore RSI does not have the purpose of improving the resolution and/or optical sectioning capability of an imaging system.

A. D. Birch, D. R. Brown, J. R. Thomas and E. R. Pike "The application of photon correlation spectroscopy to the measurement of turbulent flows", J. Phys. D. App. Phys. 6, L71-73 (1973) describe a beam splitter (in their FIG. 1). The described beam splitter was not intended for imaging purposes or resolution and/or sectioning improvement but was used for photon correlation spectroscopy to detect turbulent airflow.

SUMMARY OF THE INVENTION

The present invention provides a new technique to apply the resolution enhancing effect identified by Sandeau et al. in the context of the 4Pi microscope more broadly to other image generation systems, and in particular to standard confocal microscopes. In particular, embodiments of the present invention will allow the operation of confocal microscopes with relatively open pinholes (e.g. 1 Airy unit or even without any pinhole) whilst still giving a significant XY resolution improvement. In addition axial (Z) discrimination or resolution may also be improved. Embodiments of the invention achieve this aim by splitting the emitted light path in an interferometric fashion at a position in the standard system it would normally not be split. This would typically be after the objective and after the (de-)scanning optics but before the pinhole or another spatially discriminating detector. At least one of the split beams is then directed to an image transformation system, which applies an image transformation which spatially displaces those parts of the image which are not on or near the optical axis within the image plane. For example, the image transformation may be an image inversion which inverts at least one coordinate in image space. The transformed beam and the non-transformed beam are then recombined in an interferometric fashion (i.e. coherently added), which provides an interference effect resulting in increased resolution of the image. Where the embodiments are being used in a confocal application, the resulting combined beam is then typically subject to a spatially discriminating means, such as an adjustable pinhole, or the like. However this is not strictly necessary as the main effect stems from the loss of light to the other output-path of the interferometer once the amplitudes of the interfering beams differ.

In view of the above, from a first aspect the present invention provides an apparatus for improving the resolution and/ or sectioning ability of an imaging system, comprising: at least one wave splitter for splitting an input wave carrying information relating to an object to be imaged; an interferometer arrangement arranged to receive the split input waves and which includes a wave transformer which produces a relative difference between the waves travelling through the interferometer in dependence on one or more spatial properties of a set of emitter positions, and which outputs at least one output wave, wherein the energy density of those parts of the output wave which are due to emitters not located at the set of emitter positions is reduced; and imaging means arranged to capture the information relating to the object carried in the at least one output wave to produce an image; wherein the reduction of the detected emissions from emitters not located at the set of emitter positions improves the resolution and/or sectioning ability of imaging of the object.

From a second aspect there is provided a method for improving the resolution and/or sectioning ability of an imaging system, comprising the steps a) splitting an input wave carrying information relating to an object to be imaged into at least two waves; b) applying one or more transformations to one or more of said waves so as to produces a relative difference between the waves; c) interferometrically recombining the waves to provide an output wave; wherein the transformations step b) and recombination step c) are further arranged such that the energy density of those parts of the output wave which are due to emitters not located at a set of emitter positions from which emitted waves undergo equal or no transformations in the split waves is reduced; and d) capturing the information relating to the object carried in the at least one output wave to produce an image; wherein the reduction of the detected emissions from emitters not located at said set of emitter positions improves the resolution and/or sectioning ability of imaging of the object.

With such arrangements, the interferometric resolution-enhancing effect identified by Sandeau et al. in the context of the 4Pi microscope can be applied to other imaging systems, such as, for example, confocal microscopes. Moreover, the technique can have application outside the field of microscopy, and may also be used with imaging systems in other fields, such as (but not limited to) photography, telescopy, infrared imaging, radar imaging or ultrasonic medical imaging.

Within embodiments of the invention to be described a wave splitter can include any means suitable to split an incoming input wave into one or several waves leaving the wave splitter. A wave splitter generates waves such that the same spatial part of the input wave is present in its outputs. Wave splitters can split the incoming wave with various ratios. In some situations non-equal splitting (e.g. 90%:10%) can be advantageous for contrast reasons. A wave splitter can also produce output waves of any relative direction, including spatially overlapping ones. These waves only need to be distinguishable in some way. E.g. they could have different polarisation (i.e. a Wollaston prism would also be considered a wave splitter).

Within embodiments of the invention an interferometer arrangement arranged to receive the split input waves preferably transforms and recombines the incoming waves. This can also include that only parts of the input waves are recombined. An interferometer can have several output paths, which each can be detected or discarded. It can even include situations in which more than just two possible paths for recombination exist (e.g. by introduction of elements which recombine and split simultaneously different input waves to the interferometer, or situations similar to FIG. 8 of J. D. Armitage Jr. and A. Lohmann "Rotary shearing interferometry", Optical Acta 12, 185-192 (1965)).

Moreover, within embodiments of the invention a relative difference between the waves includes intensity as well as phase differences leading to a change in nominal focus position or just plain relative phase differences. Other examples are a change in magnification or a loss of quality of the focus (e.g. by introducing aberrations). Various possibilities exist, especially the interferometer variants described in FIGS. 2a,b and FIGS. 3a,b and the right halves of FIGS. 4,6 or 8 in J. D. Armitage Jr. and A. Lohmann "Rotary shearing interferometry", Optical Acta 12, 185-192 (1965) and the drawings in this patent.

Additionally, within embodiments of the invention the one or more spatial properties of a set of emitter positions can include that the amount of relative transformation depends on a single emitter point position (e.g. an emitter on this specific point does not yield a difference, whereas it does with varying amount at all other positions, e.g. using a transformer as in FIG. 12). It can also include that no difference in transformation exists for a one dimensional set of positions (e.g. a line along the axial direction as in FIGS. 6-9) or for a two dimensional set of positions (e.g. for a whole image plane as in FIG. 11). Also several points (e.g. using multiple foci) or several lines (e.g. arranged in a grid like fashion) are possible positions for which the relative transformation is similar but different in other positions. The case of a line along an in-plane coordinate (e.g. along Y) with the transformation inverting another coordinate (e.g. along X) is particularly interesting for line-scanning imaging systems.

Furthermore, within embodiments of the invention at least one output wave includes spatially separate (e.g. FIGS. 6-9), as well as spatially overlapping waves (e.g. FIG. 10).

Also, within embodiments of the invention two output waves are produced during recombination of the split waves. For an emitter on the axis of symmetry, one output exhibits constructive interference and the other output shows destructive interference. Furthermore, embodiments of the present invention subtract one output intensity from the other output intensity; preferably the destructive output intensity (or a fraction or multiple thereof) is subtracted from the constructive output intensity.

Moreover, within embodiments of the invention energy density is often referred to as the "intensity" of a wave.

Within embodiments of the invention the term "emitters" includes coherent emitters (scatterers), incoherent emitters (e.g. fluorescent molecules). More generally, however, the term "emitters" as used herein is also intended to refer to any and all possible objects which may influence a wave, whether by emission, absorption, changing the phase, etc. (e.g. changing the phase by a different refractive index).

Within embodiments of the invention that the energy density is reduced refers to the energy density as detected from an emitter outside the set of positions in comparison to the same emitter with the same emission strength placed inside the set of positions.

Moreover, within embodiments of the invention the imaging means includes all conventional means of capturing image information. Imaging means usually include detectors such as integrating detectors (e.g. Photomultiplier tubes and avalanche photo diodes for the case of light detection), spatially resolved detectors (e.g. CCD or CMOS cameras, image intensified cameras, photon bombardment cameras, . . . ). In the case of integrating detectors the imaging means usually include scanning means (which are capable of scanning the sample and/or the illumination and/or the "set of spatial positions" in the detection setup). The imaging means can also include data processing means and/or visualisation means.

Within embodiments of the invention the at least one output wave includes the situation of only one detector, several separate detectors, but also arranging the output waves to be imaged on a spatially resolved detector (e.g. optically combining several output waves onto one CCD camera).

Moreover, within embodiments of the invention the reduction of the detected emissions includes the situation of the one detector where the amount of detected energy density reduces. At a different detector this can lead to a simultaneous increase. Combining the information from several detectors (e.g. by scaled subtraction) can be advantageous.

Within embodiments of the invention by improving the sectioning ability we include the notion of filling what is referred to as "the missing cone region" in widefield imaging (as referred in, for example, Min Gu, "Principles of Three-Dimensional Imaging in Confocal Microscopes", World Scientific, 1996).

Finally, within embodiments of the invention the improvement of the resolution and/or sectioning ability of an image includes the effect that a resolution improvement along at least one direction (e.g. X, Y or Z) in most points of the final image (including reconstruction if necessary) is obtained.

Further features and aspects of the invention will be apparent from the appended claims.

DESCRIPTION OF THE DRAWINGS

Embodiments of the invention will now be described, presented by way of example only, and with reference to the following drawings, wherein like reference numerals refer to like parts, and wherein:—

FIG. 17a is a graph of a comparison between point spread functions.

FIG. 17b is a graph of a comparison between object transfer functions.

FIG. 19a is a graph showing an interferometer having an increased sectioning capability, with the difference signal surpassing the constructive output.

FIG. 19b is a logarithmic plot showing a $z^{-2}$-dependence of a light source far away from the focal plane of an interferometer.

DESCRIPTION OF THE EMBODIMENTS

Several embodiments of the invention will now be described.

Figure 6:
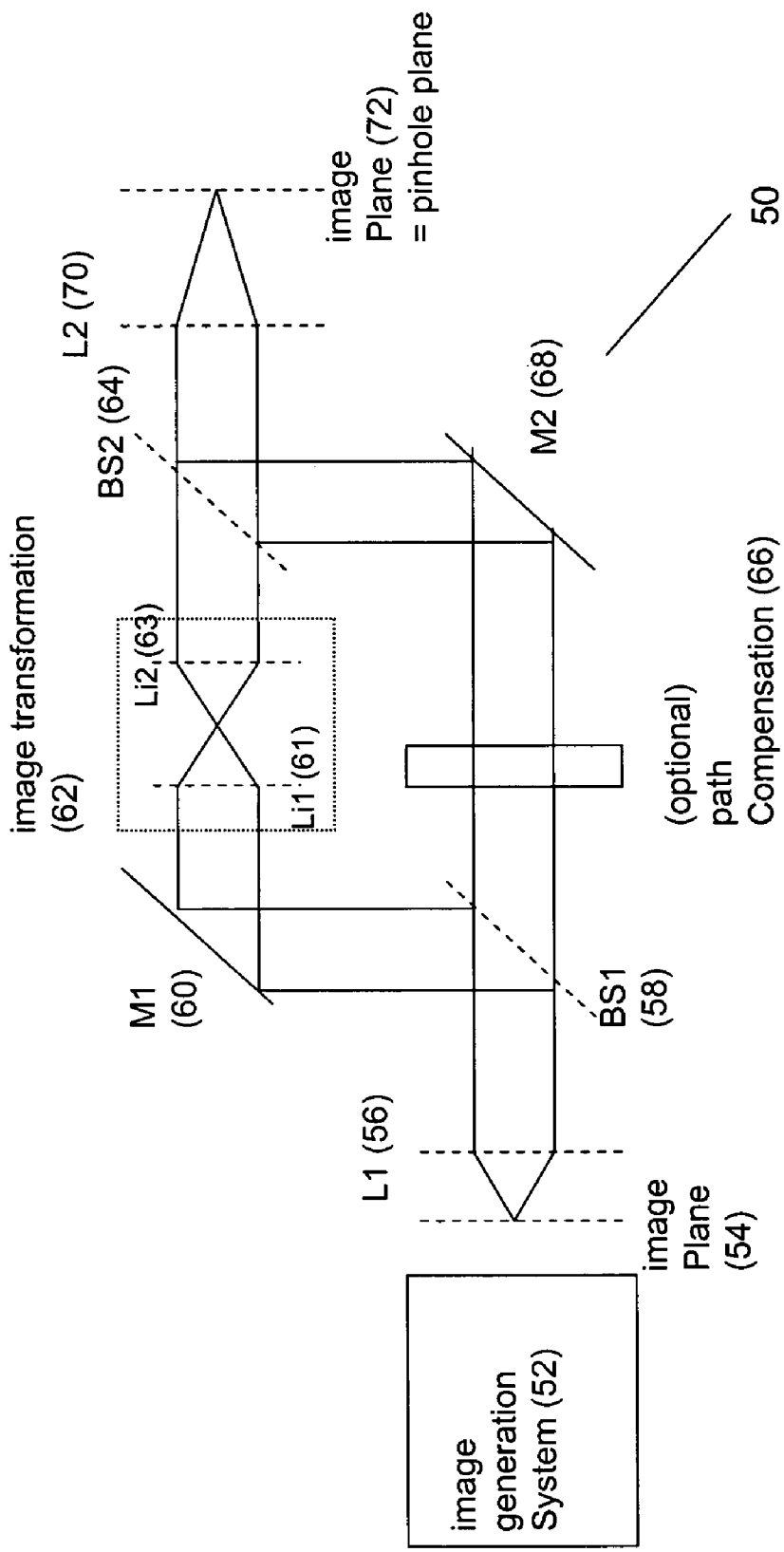
FIG. 6 is a diagram illustrating a first embodiment of the present invention.

The optical arrangement of an apparatus 50 according to a first embodiment of the present invention is shown in FIG. 6. Here, an image generation system 52 is provided which, although not part of an apparatus 50 according to the first embodiment, provides an input image into the apparatus 50. Thus, the image generation system 52 refers to a system capable of generating an image (even if at infinite distance), and in preferred embodiments the image is generated by scanning, such as in a conventional confocal microscope. For example, therefore, the image generation system in preferred embodiments may be a scanning confocal microscope, although in other embodiments a different image generation system may be used. For example, a scanning system where no confocal illumination is used would also constitute an image generation system which may be used with the presently described embodiments. The image generation system 52, whatever form it takes, provides an image on an image plane 54 as an input to the apparatus 50 of the first embodiment of the invention.

The apparatus 50 according to the first embodiment comprises a lens L1 (56) which transforms a beam obtained from a point in the image plane 54 into a parallel beam. The parallel beam is then fed to a beam splitter BS1 (58) which splits the parallel beam into two parallel beams, extending at a approximately right angle to each other. In this example the beam splitter BS1 (58) is preferably insensitive to polarisation. The two beams resulting from the beam splitter BS1 (58) then travel through an interferometric arrangement (which within the first embodiment is of a Mach-Zehnder type, described later) and are recombined at a second beam splitter BS2 (64). At least one of the beams output from the second beam splitter BS2 (64) is then passed through lens L2 (70), for imaging onto an output image plane 72, constituting an output image plane of the apparatus 50.

Where the apparatus 50 is being used with a confocal microscope as the image generation system, then an adjustable pinhole aperture can be provided at the output image plane, at the focus of the lens L2. Preferably, some form of light detector device which is not part of apparatus 50 is also present at the output image plane, to capture the light output by the apparatus 50. For example, a CCD array, film, or other light sensitive device or medium can be used. More generally, to capture the image in confocal applications a spatially discriminating image capture means which can spatially discriminate across the output image plane 72 may be used. For example, the use of one or multiple pinholes, elements of programmable devices (such a spatial light modulators, e.g. DLPs, LCOS) or pixelated or non-pixelated camera systems (e.g. CCDs, MCPs, Film, Delay line detectors . . . ) is envisaged. A sufficiently small detector (e.g. with a sensitive area smaller in diameter than 2 Airy disc diameters) is also considered to be a suitable spatially discriminating means. Even though in most application of a spatial discrimination means may be useful, there may be cases (e.g. multiphoton microscopy) in which an integrating detector is advantageous.

Returning to the apparatus 50, however, the interferometric arrangement mentioned earlier comprises a first mirror M1 (60), which receives a first parallel beam from beam splitter BS1 (58), and directs it towards an image transformation element 62 with lenses Li1 (61) and Li2 (63), which causes an image transformation to the first parallel beam in a manner described later, as the beam passes therethrough. The first parallel beam having passed through the image transformation element 62 is then directed at the second beam splitter BS2 (64).

In the other arm of the interferometric arrangement the second parallel beam output from the first beam splitter BS1 (58) is passed through an optional path length/dispersion compensation element (66), and directed at a second mirror M2 (68). The second mirror redirects the second parallel beam onto the beam splitter BS2 (64), where the second beam is then interferometrically recombined with the transformed first parallel beam.

Figure 2:
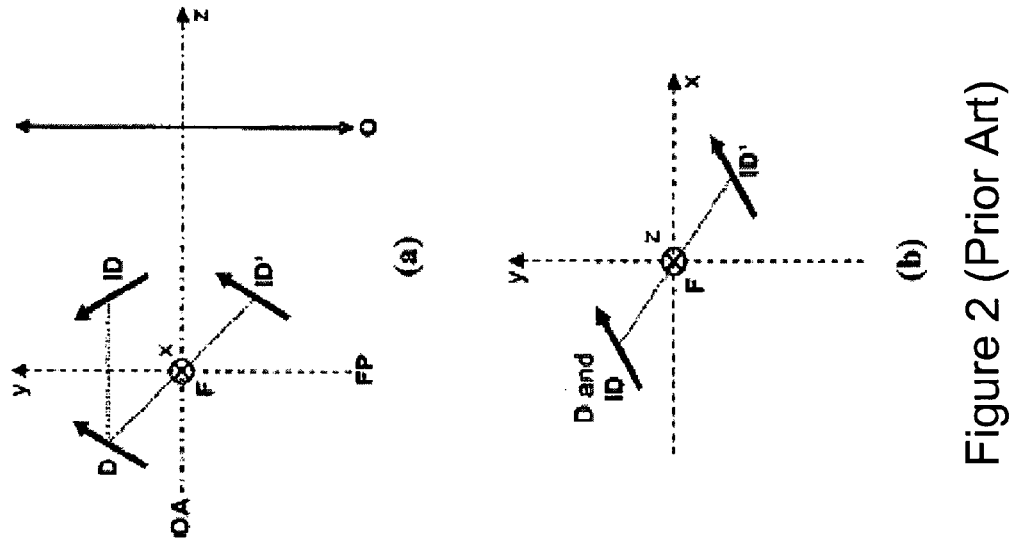
FIG. 2(a) is a diagram illustrating a concept known in the prior art, and used in embodiments of the present invention.
FIG. 2(b) is a diagram illustrating a concept known in the prior art, and used in embodiments of the present invention.
Figure 1:
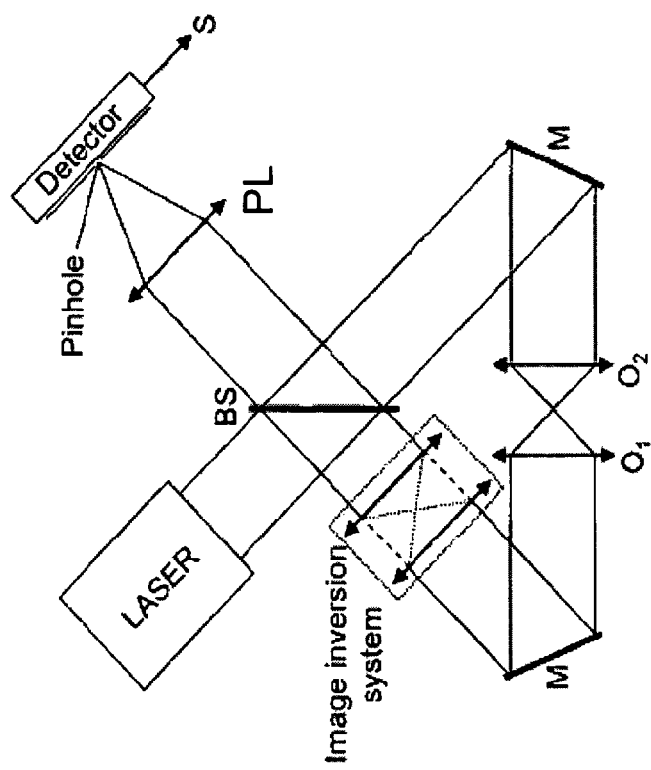
FIG. 1 is a diagram of an optical arrangement of the prior art.
Figure 3:
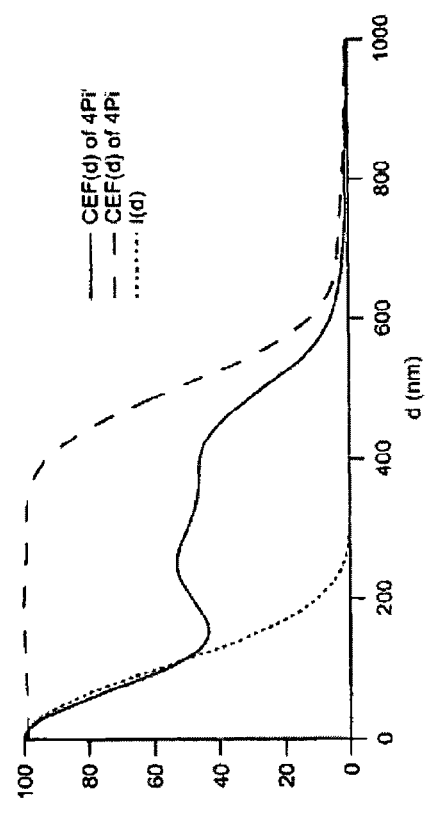
FIG. 3 is a graph illustrating prior art results.
Figure 4:
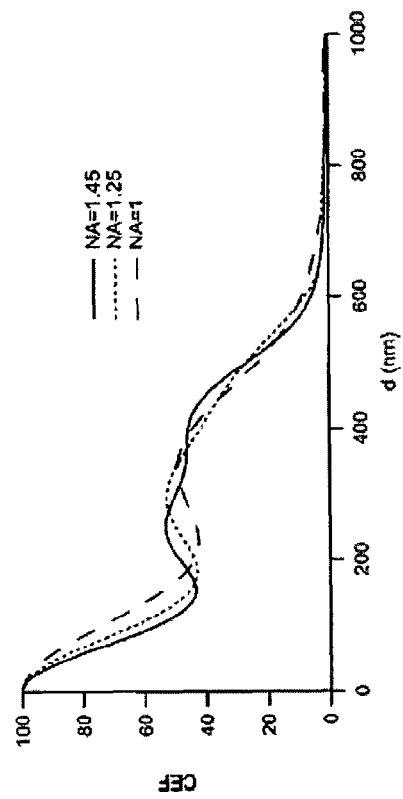
FIG. 4 is a graph illustrating prior art results.
Figure 5:
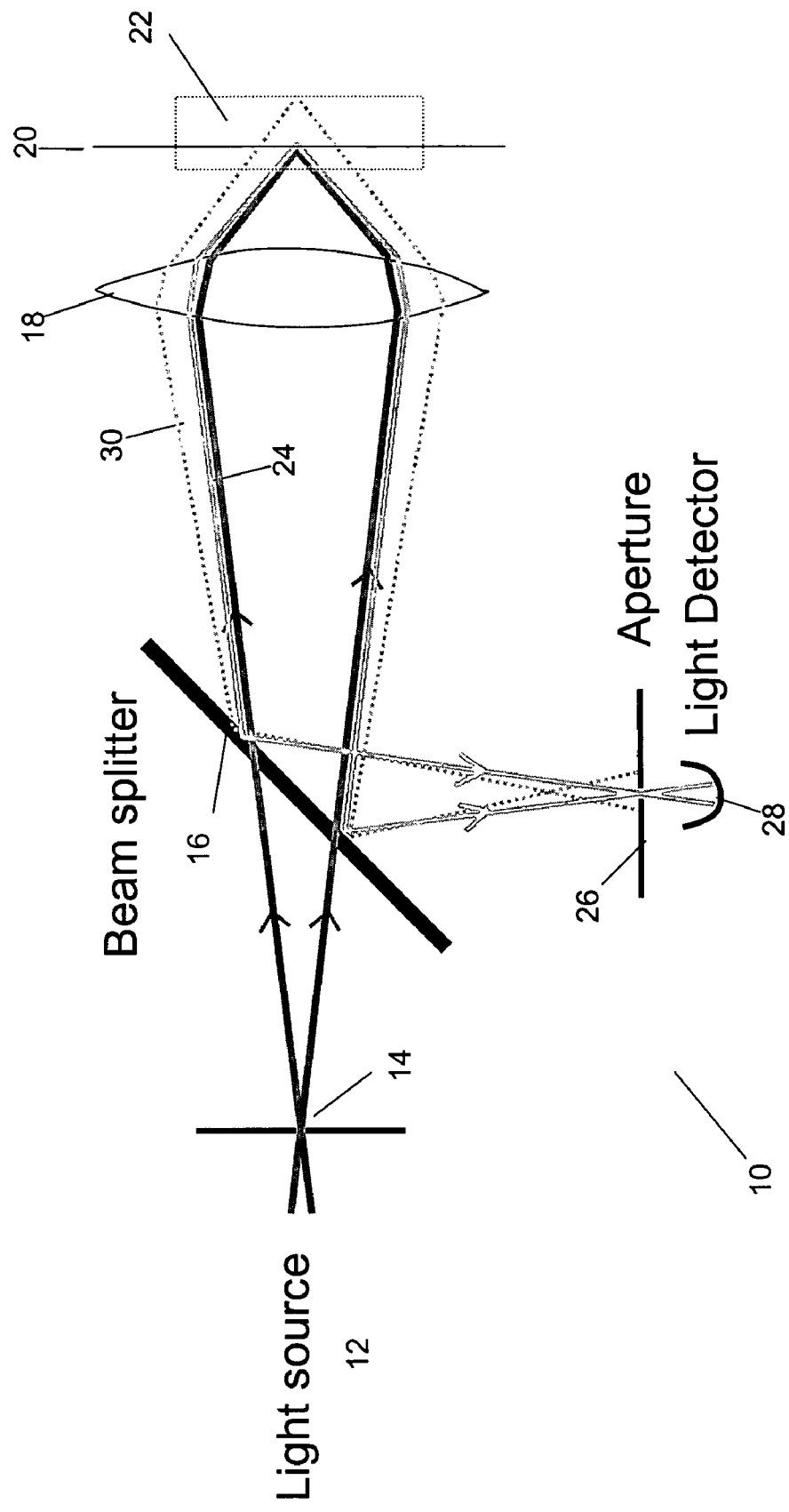
FIG. 5 is a diagram illustrating the optical configuration of a confocal microscope of the prior art.

Having regard to the image transform applied by the image transformation element 62, the work of Sandeau et al. discussed previously is applied. Sandeau et al describe how an improvement in resolution in a 4Pi microscope is obtained by applying an image transformation to one arm of the microscope such that an image of a luminophore which is laterally displaced from the optical axis is caused to be symmetric about the focus, such that if one compared the image in the transformed path with the image in the non-transformed path then the apparent X-Y positions of the same luminophore in each image would be different, being symmetrical about the focus. When these images are then interferometrically recombined, due to the spatial displacement between the respective images in each path a relatively low light intensity results on the output side of the interferometer which yielded constructive interference for objects on the axis (see e.g. the side-lobes in FIGS. 3 and 4). This effect is partially caused by destructive interference, but also in the limiting case of the two images being not overlapping, they would essentially not interfere and each would get reduced (e.g. by 50%) in intensity when passing through the beam combining optics (64).

However, such a transformation also has the effect that when the luminophore is on the optical axis, then when the transformation is applied the X-Y position of the luminophore is not substantially changed in the transformed path. When the transformed path and the non-transformed path are interferometrically recombined in the beam splitter, therefore, due to constructive interference of the two waves a much greater light intensity is obtained (see e.g. the main lobe in FIGS. 3 and 4). Under ideal conditions 100% of the input light will reach one detector whereas the second exit path of the beam combining optics (64) will receive no light.

In terms of how this effect increases the resolution of a microscope, as explained by Sandeau et al. the coherent addition of the two images results in a much higher resultant light intensity when the images are located on or near to the optical axis due to the spatial coherence of the images. In contrast when the images are displaced from the optical axis then due to the image transformation which is applied the images decrease in overlap, and the light intensity resulting from the coherent addition drops off sharply as some light leaves the beam combining optics on the second output (see e.g. FIG. 6(c) of Ref. 1). An additional pinhole helps to further suppress the signal when off axis. These effects translate to a reduction in the width of the CEF, which in turn increases the resolution. In Ref. 1, Sandeau et al. report an improvement in resolution by a factor greater than 2.

Within embodiments of the present invention the same techniques are applied, although the image transformation which can be used is not limited to producing symmetry about the focal point, as described by Sandeau et al., although such a transformation is one of those which may (and in some embodiments preferably should) be used. Additionally, however, within embodiments of the invention any transformation which results in the image of, for example, a luminophore or other light reflecting or emitting object, which is located spatially displaced (in X, Y or Z) from the nominal focus position of the imaging system being, with respect to the nominal image position of the former, spatially displaced in any of the X or Y directions, or even in the Z direction, or any combination of such displacements, may be used. On the other hand, the transformation should be such that an image which is located at or substantially near the focus (on the optical axis) is not spatially displaced at all or to any great extent, such that the image of the object in the beam subject to transformation remains in substantially the same place in the image plane as the image of the object in the other beam (i.e. the beam not subject to the image transformation). The overall intention of the image transformation is to provide for off-axis or differently focussed images to appear at a different spatial position (in 3D) in the transformed beam than in the non-transformed beam, such that when the two beams are coherently added a lower intensity resultant product is obtained. Conversely, for substantially on-axis and in focus images the transformation should be such that the images do not appear at substantially different positions in the transformed beam and non-transformed beam, such that the spatial coherence between the two beams remains high. Then, when the beams are coherently recombined yielding constructive interference, a higher intensity resultant product will be obtained, which in turn leads to the effect of increased resolution.

As examples of suitable image transformations which meet these criteria, any transformation which changes or inverts at least one coordinate about where points of the object get imaged to can be used. For example, in one such transformation the X coordinate may be inverted, or in another such transformation a co-ordinate (X or Y) may be subject to a displacement (either positive or negative), the size of the displacement preferably being dependent on the location of the image with respect to the focus, with no displacement being applied to an image located at the focus. Another suitable transformation would be to use a point-inversion of both the X and Y coordinates, corresponding to a 180 degree rotation in of the image in the X-Y plane. Other rotational transformations may also be used, e.g. 45 degree, 90 degree, or any other value which results in an appropriate spatial displacement. In this case additional polarisation rotating elements may be necessary to ensure effective interference of the light fields (having the vectorial nature of electric fields in mind).

Also a suitable transformation would be if one image is defocused in Z, its transformed counterpart defocuses in −Z. A possible way to achieve this is with the help of a phase conjugate mirror or material of negative refractive index (Sir Pendry's lens) (e.g. replacing M2 in FIG. 8).

Figure 11:
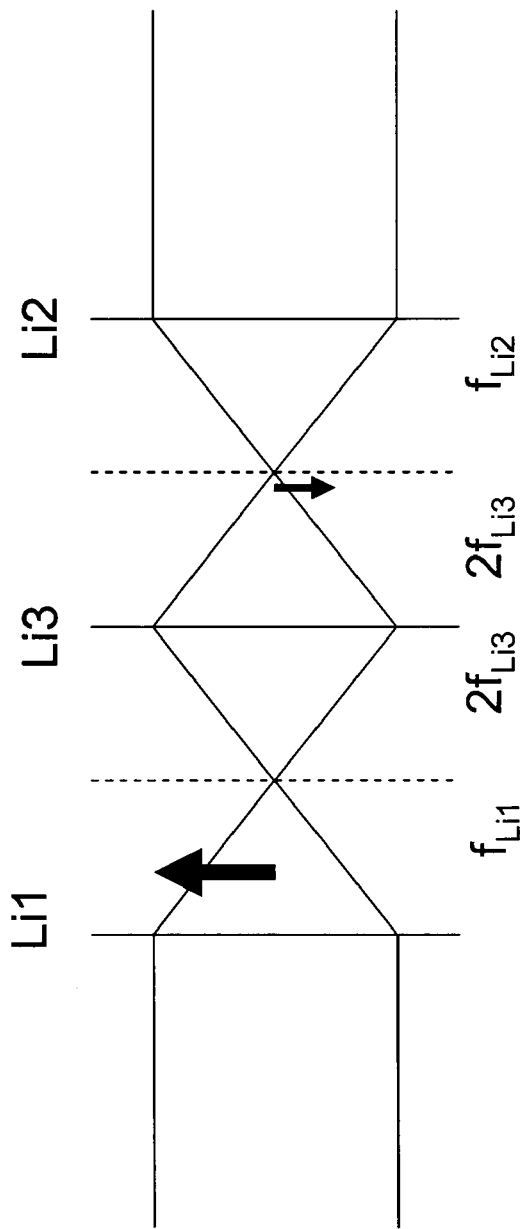
FIG. 11 is a diagram illustrating a sixth embodiment of the present invention.

Another alternative is to use an imaging system with a different Z behaviour in the transformed path (FIG. 11). These methods based on axial (Z) displacement can be used in combination with the XY transformations exemplified above, however with a parallel (widefield) image capture system in mind it may also be advantageous to have a system which does not depend on the position of the optic axis (meaning no path specific XY transformation is being applied). At a first glance, the emission from within the focal plane is imaged coherently everywhere onto the output plane. However, in there may be additional phase shifts presents depending on the in-plane position of the focussed output wave. This can be used to advantage (e.g. in a scanning setup similar to FIG. 7). To achieve constructive interference for the whole field of view, appropriate spatially dependent phase compensation means are needed.

In terms of optical components to perform a suitable transformation of the type noted above, in one embodiment a combination of two parfocal lenses may be used to invert an image, whereas in other embodiments multiple inversions of parts of the image may be obtained by using combinations of lens-lets or holographic optical elements. Other image inversion systems which can produce a suitable transformation will be apparent to the skilled reader, and further examples are given in later embodiments described below.

In the ideal case the beam which is not subject to the image transformation preferably has a zero optical path length difference to the optical path length of the beam which is subject to the transformation (assuming the input beam of the system is collinear (on the same optic axis) with the image transformation system). To achieve this one may introduce a path compensation optics (non-inverting), e.g. a suitably thick piece of transparent material (to compensate for the lenses and a possible geometrical path difference in the other path, which can also yield a chromatic compensation) that is optically thicker than air. An alternative to the introduction of such path compensation optics would be to construct the interferometer such that the non-transforming geometrical path is longer so as to compensate for the increased optical path length in the transforming arm. This may mean that the beam splitter angles are slightly changed and the mirrors displaced.

Note that the lens L1 (56) and the input image plane would be unnecessary if the focussing lens (tube lens or pinhole lens) is removed (e.g. as in FIG. 7) as modern microscopes have an infinity path. In this preferable case L2 (70) serves as the image generating lens. In microscopes where an objective directly images onto the primary image plane, one may remove all lenses which are not part of the image transformation system (62) in FIG. 6 and fit the interferometer directly into the beam path before the primary image plane.

Figure 7:
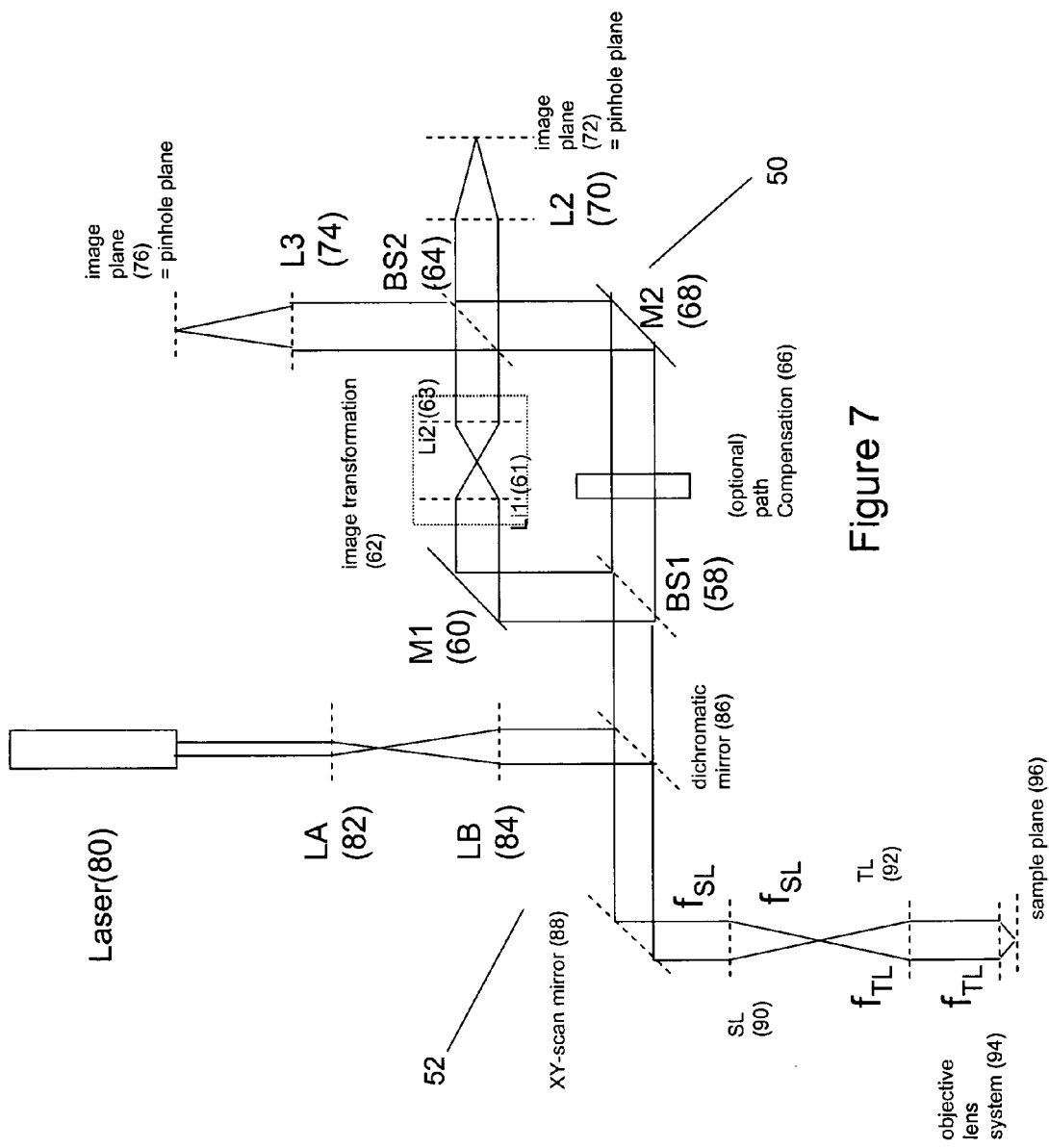
FIG. 7 is a diagram illustrating a second embodiment of the present invention.

Note that it is advantageous, although not essential, to also record the data (with or without a spatially discriminating means) in the other output arm of the interferometer, being the other output from the second beam splitter BS2 (64) (not shown in FIG. 6, see FIG. 7 (74,76) for an example).

With such an arrangement the use of the image transformation and the subsequent interferometric recombination of the transformed beam and the non-transformed beam produce the same effects as reported by Sandeau et al., with an attendant reduction in the CEF of the arrangement, and improvement in resolution.

A second embodiment of the present invention will now be described with respect to FIG. 7. In particular, within the second embodiment a slightly modified version of the apparatus described previously with respect to the first embodiment is employed within a confocal microscope arrangement.

More particularly, the apparatus 50 according to the first embodiment of the present invention is used with the confocal microscope elements 52, which act as the image generation system in the context of the first embodiment described previously. Here, the image generation system comprises a laser 80, whose beam is expanded by a beam expander comprising lens LA (82) and lens LB (84). The beam is expanded to form a parallel beam with a diameter big enough to illuminate the full back aperture of the objective lens system, when taking into account the scan lens SL (90), and the tube lens TL (92). Preferably the laser is fibre coupled to the microscope, which means that in the context of FIG. 7 the two ends of the fibre would correspond to the focal point shown between lens LA and lens LB. This allows the laser and lens LA to be at a different location, and the optical fibre would then emit the laser light at the focal point before lens LB.

The parallel beam output from the beam expander then strikes dichromatic mirror 86 which serves as a dichromatic beam splitter to reflect the laser light, whilst transmitting the fluorescent light emitted by the sample. In this respect, as is well known, in most samples the fluorescence is at a different wavelength than the illuminated beam. In other embodiments, depending on the application the dichromatic mirror 86 could also be a neutral beam splitter (e.g. for reflection imaging), or another device such as an acousto-optical beam splitter.

Within the present embodiment the dichromatic mirror 86 reflects the illuminating laser beam onto a scanning mirror 88 which is controllably moveable to alter the angle at which the illuminating beam leaves the scan mirror. In this embodiment, the XY scan mirror preferably scans fast along the X axis, and slow along the Y axis so as to effectively raster-scan across the image plane. Other known scanning techniques can also be used to provide further embodiments. As well as directing the illuminating beam, at the same time the scan mirror serves to de-scan the emitted light (e.g. fluorescence from the sample), such that (neglecting the speed of light and the time delay between excitation and emission) the sample information right from the middle of the scanning spot in the sample will be collinear (and stationary) at the entrance (58) to the interferometer and the dichromatic mirror, albeit with opposing direction of travel, with the excitation beam position.

The illuminating beam (excitation beam) reflected from the XY scan mirror 88 passes through the scan lens (SL) (90) and then the tube lens TL (92). The scan lens serves in combination with the tube lens in a 4-f configuration to keep the light intensity distribution at the back focal plane of the objective lens 94 independent of the scan position. The alteration in angle of the beam due to the XY scan mirror then translates the scanning spot in the sample plane. The emitted light (which may either be scattered light, or fluorescence) passes through the objective lens system (94), the tube lens 92, and the scan lens 90, is then de-scanned by the XY scan mirror 88, and directed towards the dichromatic mirror 86. As mentioned, the dichromatic mirror can be arranged to reflect light at the wavelength of the illuminating (excitation) beam, but not to reflect light at the wavelength of the emitted light. Thus, the emitted light passes through the dichromatic mirror 86, and then into the modified apparatus 50 according to the first embodiment of the invention. The modification required to the apparatus 50 is that because in this embodiment the apparatus is intended to be integrated with the microscope optics, then there is no need for lens L1 to image an input image plane. Instead, the output beam of the microscope can be fed directly into the interferometer arrangement of the apparatus 50.

Within the interferometer arrangement, as described previously, the emitted light beam is split by beam splitter BS1 (58), resulting in a first emitted beam which is then reflected via mirror M1 (60) through an image inversion system 62, which applies an image transform in the manner described previously in respect of the first embodiment. The transformed beam then passes to the second beam splitter BS2 (64).

The other beam output from beam splitter BS1 (58) passes through an optional path compensation element 66, and then is reflected by mirror M2 onto the second beam splitter BS2 (64). At the second beam splitter BS2 the transformed beam and the non-transformed beam are interferometrically recombined (coherently added) and the resulting two output beams of the beam splitter 2 are then focused by respective lenses onto respective image planes. More particularly, a first output beam from beam splitter 2 is focused by lens L2 (70) onto a first output image plane 72 at which is located, for example, a spatially discriminating means, such as a pinhole, a plurality of pinholes, integrating detectors or the like, as described previously. Similarly, the second output beam from the beam splitter 2 is focused by lens L3 (74) onto a second output image plane 76, again at which may be placed a spatially discriminating means. Alternatively, no such spatially discriminating means may be used at one or both of the output image planes 72 and 76, and instead all of the intensity represented by the second output light beam collected. Collecting both output beams of the second beam splitter as opposed to collecting just one output direction may help to increase the overall signal-to-noise ratio of the system.

Both outputs can also be combined onto a single joined image plane, e.g. by sending the beam directed towards L3 (74) instead with a mirror under a slight angle towards L2 (70) forming a displaced image in image plane 72.

Within the second embodiment of the present invention, therefore, the apparatus 50 of the first embodiment is integrated into a laser scanning confocal microscope. The advantage of using the apparatus 50 of the first embodiment with a laser scanning confocal microscope 52 is that the increase in resolution discussed previously is obtained, by virtue of the image transformation, and the interferometric recombination of the transformed beam and the non-transformed beam.

A third embodiment of the present invention will now be described with respect to FIG. 8. This embodiment is similar to the first embodiment described previously in that an apparatus 100 is provided which receives an input image generated from an image generation system 52 which provides an input image at an input image plane 54. However, here the interferometer is of a different type, and a particular image transformation system in the form of an image inversion system is used.

More particularly, within the third embodiment the interferometer is of the Michelson type, which means that the same beam splitting element is used for both splitting and recombining the beams.

Figure 8:
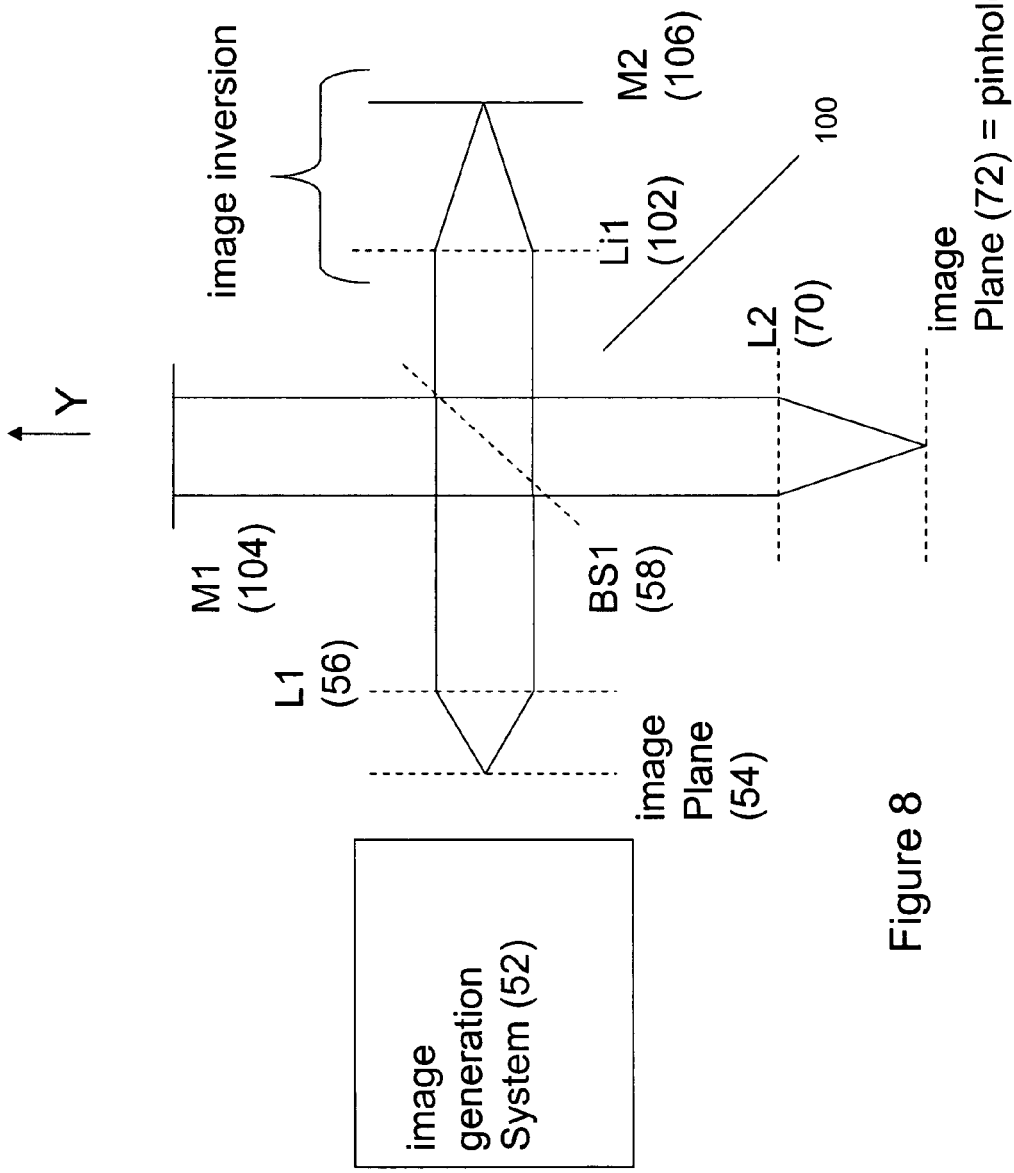
FIG. 8 is a diagram illustrating a third embodiment of the present invention.

More particularly, with reference to FIG. 8 an apparatus 100 according to the third embodiment of the present invention comprises a first lens L1 (56) arranged to receive light from the input image plane 54. The lens L1 produces a parallel beam representing a point in the image plane 54, and directs the parallel beam towards the beam splitter BS1 (58). The beam splitter 58 provides a first output beam corresponding to the transmission of the beam through the beam splitter, and a second output beam corresponding to a reflection of the input beam from the beam splitter. The first output beam is directed towards an image inversion system, which provides an image transformation in the form of an image inversion. More particularly, the image inversion system comprises a lens Li1 (102) and a mirror M2 (106). The lens Li1 (102) focuses the first output beam from the beam splitter 58 onto the surface of the mirror M2 (106), from which the beam is then reflected back to lens Li1 (102), which in turn converts the reflected beam back into a parallel beam. The operation of the lens Li1 and the mirror M2, however, acts to invert the image in both the X and Y co-ordinates. The inverted beam then travels back to the beam splitter 58.

With respect to the second output beam from the beam splitter, this is directed towards mirror M1 (104) and reflected back from mirror M1 to the beam splitter 58.

At the beam splitter 58, the non-inverted beam from mirror M1 and the inverted beam from the image inversion system are interferometrically recombined at the beam splitter BS1, to produce a first recombined output beam, and a second recombined output beam, at right angles to each other. The second recombined output beam is directed from the beam splitter 58 back towards the image plane 54. The first recombined output beam, being the beam which is directed from the beam splitter 58 travels towards a second lens L2 (70) which acts to image the beam onto an output image plane 72. Where the apparatus 100 according to the third embodiment is being used with a confocal imaging system, a spatially discriminating means such as a pinhole or the like, as discussed previously, can be located at the output image plane 72.

The effect of the apparatus 100 of the third embodiment is the same as that described previously with respect to the first embodiment, in that the resolution obtainable by the entire imaging system including the apparatus 100 is increased. This increase in resolution is obtained by the same effect as used in the previously described first embodiment. In some respects, however, the Michelson interferometer arrangement used here is simpler than the Mach-Zehnder interferometer arrangement used in the first embodiment, and the image transformation system in the form of the image inversion comprising lens Li1 and mirror M2 is simple to set up and implement.

There is one disadvantage with this arrangement of the third embodiment when compared to that of the first embodiment, however, in that the second recombined output beam from the beam splitter would be directed towards the input of the apparatus 100, which makes the measurement of this recombined output beam more difficult, but not impossible. An intentional rotation of the interferometer (e.g. about the Y-axis) would be one way to separate this path (with an appropriate mirror edge). Another way would be to insert a beam splitter in the input path, and accept the loss in intensity.

Alternatively, one could use polarisation characteristics to achieve the separation of the beams. Thus, for example, a polarising beam splitter followed by a lambda/4 plate could be used, either before the interferometer, or in each of its arms. The returning beam would then be separated by the polarising beam splitter. The split input beam (which would be of the opposite polarisation to the returning beam) could be subjected to a similar system, offering the advantage of polarisation resolved data using separate detectors. The output of the two systems could also be joined (e.g. p and s-polarisation can be recombined with little loss into one beam towards the detector), or one of the polarisation beam splitter outputs not forming the input beam to the interferometer could be discarded.

A further advantage of the arrangement of the third embodiment is that mirror M2 could further be coated with a spatially varying phase filter, leading to a further resolution enhancement, and offering the possibility of point-spread-function engineering.

If necessary, appropriate materials, such as glass, can be inserted into any arm of the interferometer to compensate for non equal optical path length due to dispersion.

Figure 9:
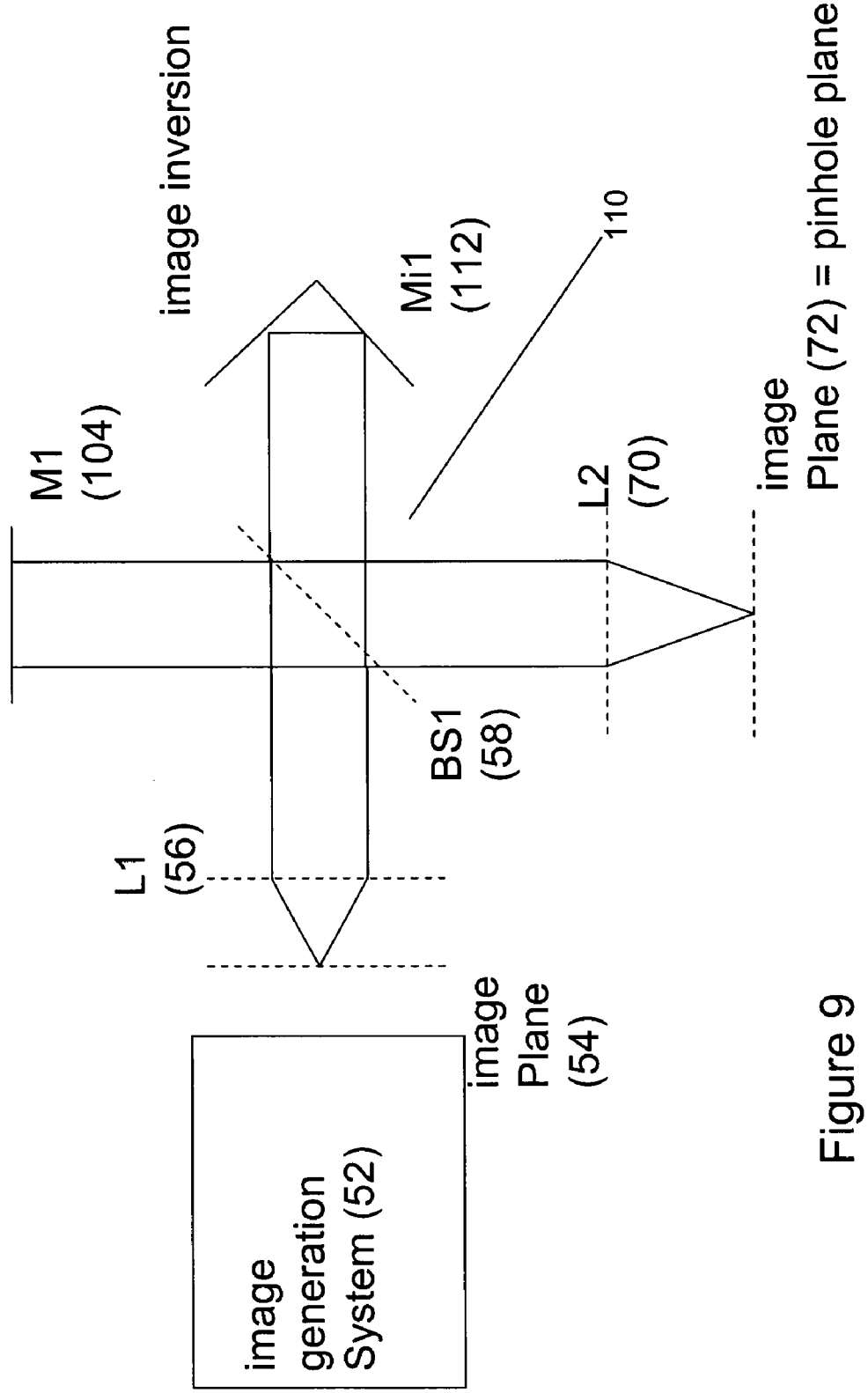
FIG. 9 is a diagram illustrating a fourth embodiment of the present invention.

A fourth embodiment of the invention will now be described with respect to FIG. 9.

Within the fourth embodiment an image resolution enhancing apparatus 110 is provided, based upon the Michelson interferometer arrangement of the third embodiment, and described previously. However, within the fourth embodiment the image transformation system is a different arrangement, the lens L11 and mirror M2 of the third embodiment being replaced by an image inverting mirror Mi1 (112). The image inverting mirror Mi1 may be formed from two mirrors joined with a relative angle of 90°, or by an appropriately cut prism. The transformation obtained by such a mirror (or prism) would be that only one direction of the image would be inverted e.g. the positive X direction in the image would become negative X.

In a variation, instead of being only two mirrors, (or sides of a prism), in a variant three mutually perpendicular mirrors could be used, or an appropriately cut 90° corner prism based on total internal reflection, as is commonly used in distance measurement tools. With three such reflecting surfaces then both an inversion in the X and Y directions is obtained. Again, appropriate materials such as glass can be inserted into any arm of the interferometer to compensate for non-equal optical path lengths due to dispersion.

With the above arrangement, the operation of the fourth embodiment is identical to that of the third embodiment as previously described, but with the difference described in how the image transformation system is configured and operates, and the subsequent transformation obtained.

Figure 10:
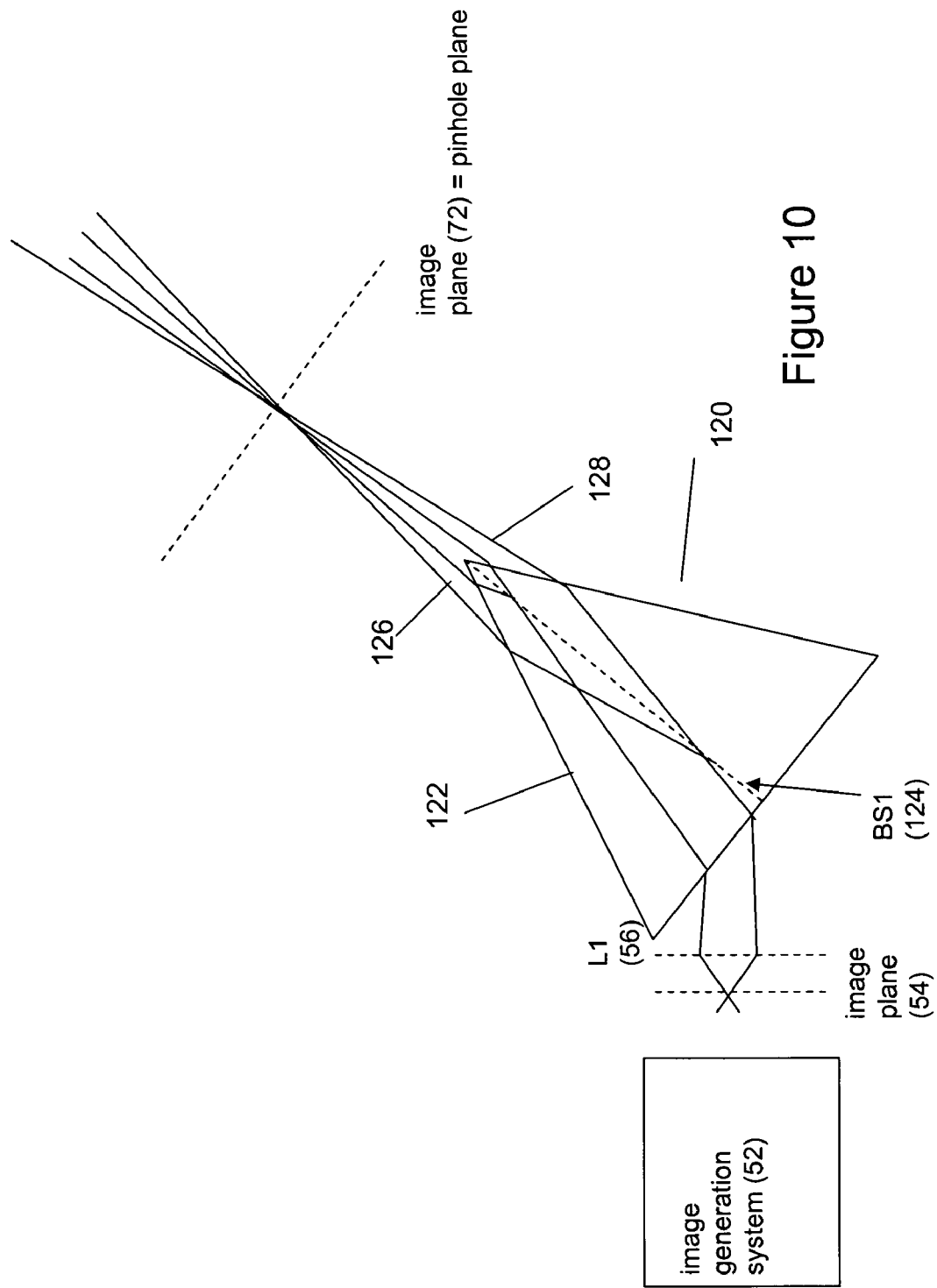
FIG. 10 is a diagram illustrating a fifth embodiment of the present invention.

A fifth embodiment of the present invention will be described with respect to FIG. 10.

Here, an image generation system 52 generates an image at an input image plane 54. A lens L1 56 images the input image plane 54, and directs light onto a first surface of a triangular prism 122. The triangular prism 122 has formed within it extending along a central axis of the prism perpendicularly from the first surface to the opposite point of the triangular prism, a beam splitter element BS1 (124). The entrance surface of the prism 122 can also be cut at a different angle, e.g. such that it is perpendicular to the optical axis of the input beam. The lens L1 is positioned with respect to the input image plane 54 such that the lens L1 is not at its focal distance from the image plane, but instead positioned such that it generates an image in the output image plane 72. Thus, the beam output from the lens L1 onto the first surface of the prism 122 is a slightly converging beam.

The prism 122 is arranged such that the first surface thereof is at an angle to the converging beam output by the lens L1 (56) and this means that as the converging beam enters the prism the beam is refracted by the prism material and caused to change direction (if the prism is not cut appropriately). The converging beam then passes onto the beam splitter BS1 (124), wherein it is split into a first output beam comprising the beam which passes through the beam splitter, and a second output beam comprising the beam which is reflected from the beam splitter. The first output beam then carries on through the prism and strikes a second surface of the prism, passing out of the prism and at the same time being refracted so as to change direction. Similarly, the second output beam, being the beam reflected from the beam splitter hits a third surface of the prism as it exits the prism, and is refracted as it leaves the prism. The change in direction of the two beams brought about by the respective refractions as the beams leave the prism is such that the beams are directed towards each other at a slight relative angle. Where the beams combine interference between the beams occurs. When the relative angle is small enough to yield interference fringes which are bigger than the pinhole size then an appropriate resolution enhancing effect is present.

Concerning the range of angles at which the two beams may be directed towards each other, it is envisaged that the angle may be as large as 45 degrees. The factors involved are the pinhole (or other spatially discriminating means) size, and the microscope magnification. In particular, larger angles will generate smaller interference fringes. If the fringes are much smaller than the pinhole size (or pixel size if there is a spatial resolving detector as a spatially discriminating means) the whole system would tend more toward an incoherent system, which destroys the effect. Therefore, the angle between the two beams should be as small as possible to obtain as much of the resolution enhancing effect as possible, but subject of course to the overall size constraints of any particular implementation (i.e. the space available to set out the optical components).

In this embodiment, the beam splitter BS1 represents an element which both splits the input beam into two paths, as well as performing an image transformation, as the image arising from the reflected beam will have a different orientation than the image generated from the transmitted beam. Similarly, the prism can be thought of as a beam recombining element, as it is the prism which refracts the beams from the beam splitter towards each other such that they re-combine. Thus, within this fifth embodiment, although the arrangement is very different to the previous embodiments, the input beam is split into two, one of the beams is subject to an image transformation being in this case a spatial inversion, and the resulting transformed beam and non-transformed beam are interferometrically recombined to achieve the resolution enhancing effects described previously.

A sixth embodiment of the present invention will be described with respect to FIG. 11.

This embodiment details the image transformation, unit which can be replaced in any embodiment where the split beams are sufficiently spatially separate. Here Li1 serves to generate an image plane (left dashed line) which is then re-imaged in a 2f geometry with the help of lens Li3. Finally Li2 is situated at one focus length from the second image plane (right dashed line) and serves to make the light parallel. This embodiment would not invert the image. However, it does a non-linear transformation along the axial (Z) direction. This concept is sketched as an example by indicating the imaging behaviour of an object which is out of focus (leftmost big arrow). The 2f reimaging geometry will image such an out-of-focus object by a (Z) position dependent magnification (right smaller arrow), yielding the transform.

It is potentially advantageous, if the reimaging lens Li3 has a smaller focal length than Li1 and Li2. It also does not necessarily need to be a 2f reimaging as other geometries could yield a stronger effect.

This embodiment leaves XY positions unchanged, when in the plane of focus. This is advantageous for the application of widefield imaging. The Z-dependent magnification in only one of the interferometric paths could allow optical sections to be taken.

A seventh embodiment of the present invention will be described with respect to FIG. 12.

This embodiment also refers to the image transformation unit which can be replaced in any embodiment where the split beams are sufficiently spatially separate. Here Li1 serves to generate an image plane (left dashed line) which is then re-imaged twice, each in a 2f geometry, with the help of lenses Li3 and Li4. Finally Li2 is situated at one focus length from the third image plane (right dashed line) and serves to make the light parallel. In comparison to the previous embodiment this embodiment combines a non-linear transform with an in-plane image inversion. The concept is sketched as an example by indicating the imaging behaviour of an object which is out of focus (leftmost big arrow). The 2f reimaging geometry will image such an out-of-focus object by a (Z) position dependent magnification (middle smaller arrow), yielding a transform. The second re-imaging optics serves mainly to invert the image, but it also accentuates the non-linear magnification in dependence on Z-position.

Figure 13:
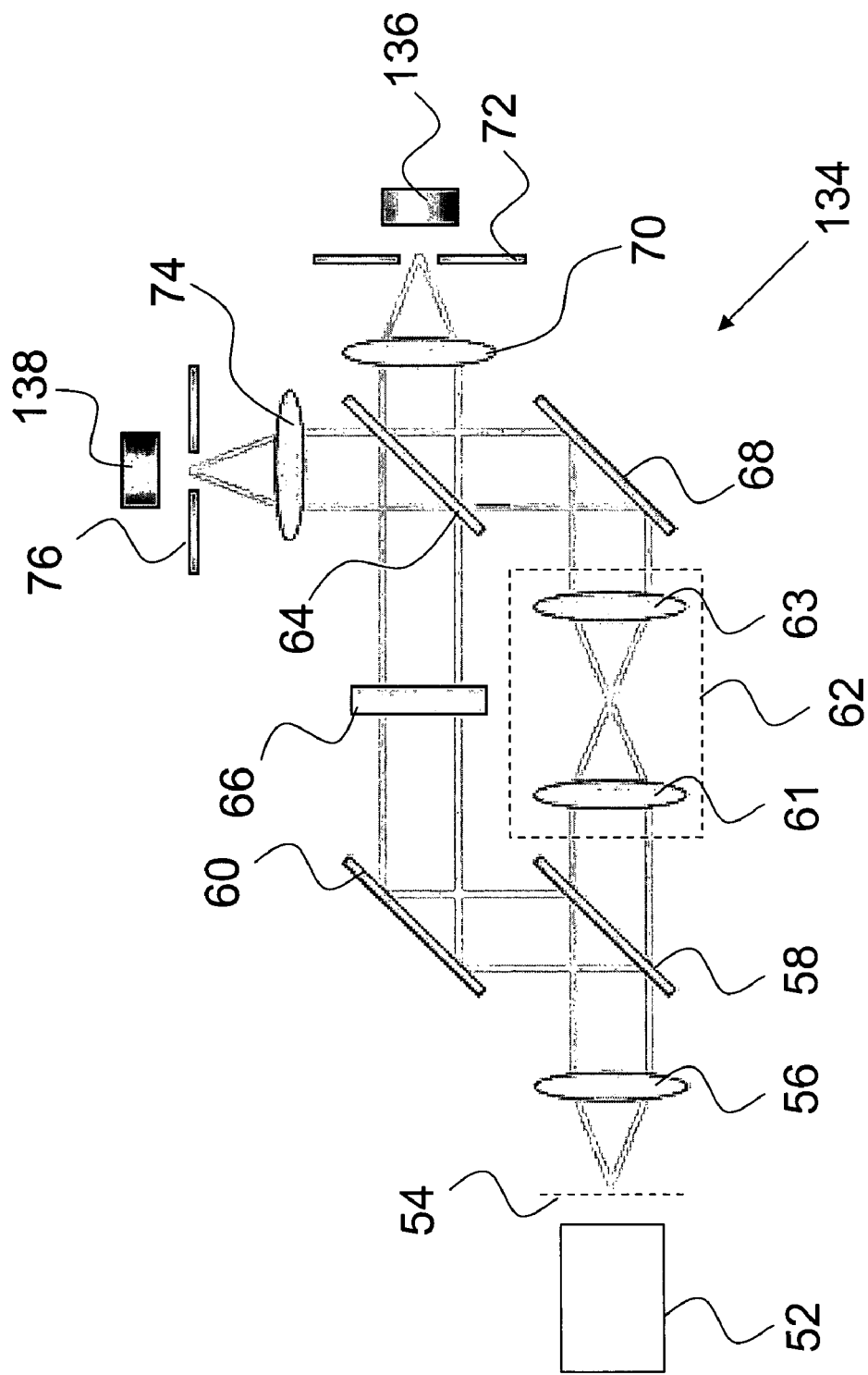
FIG. 13 is a diagram illustrating an eighth embodiment of the present invention.

An eighth embodiment of the present invention will be described with reference to FIG. 13.

In particular, within the eighth embodiment an interferometer 134 is provided, based upon the interferometer arrangement of the first embodiment. Within the interferometer arrangement 134, as described previously with respect to the first embodiment, the emitted light beam from image generation system 52 is transformed from a point in the image plane 54 into a parallel beam by lens L1 (56). Here in the eighth embodiment, the parallel beam is split by beam splitter BS1 (58), resulting in a first emitted beam which is then reflected via mirror M1 (60) through an optional path compensation element 66 onto the second beam splitter BS2 (64).

The other beam output from beam splitter BS1 (58) passes through an image inversion system 62, which applies an image transform in the manner described previously in respect of the first embodiment, and then is reflected by mirror M2 (68) onto the second beam splitter BS2 (64). At the second beam splitter BS2 (64) the transformed beam and the non-transformed beam are interferometrically recombined (coherently added/subtracted) to produce a first output beam and second output beam of the BS2 (64) as previously described with respect to the second embodiment. The first output beam from BS2 (64) is focused by lens L2 (70) onto the first output image plane 72 at which is located, for example, a spatially discriminating means, such as a pinhole, a plurality of pinholes, integrating detectors or the like, as described previously. Similarly, the second output beam from the BS2 (64) is focused by lens L3 (74) onto a second output image plane 76, again at which may be placed a spatially discriminating means. Alternatively, no such spatially discriminating means may be used at one or both of the output image planes 72 and 76, and instead all of the intensity represented by the second output light beam collected.

It is noted that one distinction between the eighth embodiment and the first and second embodiments is that the positions of the compensation element 66 and the image inversion system 62 are swapped around with respect to each other. However, this particular rearrangement does not alter the effect of the interferometer arrangement of the eighth embodiment when compared to the interferometer arrangements of the first and second embodiments.

In the eighth embodiment, the first output beam represents for an on-axis emitter a constructive output of the interferometer and the second output beam represents a destructive output of the interferometer. After passing through optional spatially discriminating means 72 and 76, both the first and second output beam's intensities are measured at detectors 136 and 138 respectively. Detectors 136 and 138 are in turn connected to a common processing unit (not shown). The detectors 136 and 138 and the common processing unit do not form part of the apparatus 134 of the eighth embodiment. The processing unit receives both respective outputs from the detectors 136 and 138, and then subtracts the destructive output from the constructive output to generate a single output having improved resolution when compared to the resolutions of either the constructive or destructive outputs.

More particularly, for the case of light emitted on the optical axis the spatially inverted amplitude image leaving the image inversion system 62 will be identical to the non-inverted one leaving the compensation element 66. Therefore, following interferometric recombination at the second beam splitter 64, all light will be collected in the constructive, or first, output, while the destructive, or second, output will remain dark. However, for the case of light emitted far off-axis, the inverted and non-inverted amplitude images will have hardly any spatial overlap and cannot interfere, therefore leading to equal intensities in both the constructive output and destructive output. At intermediate distances from the axis, destructive interference can dominate the signal in the constructive output. This general bias of on-axis light being detected preferably in the constructive output leads to a lateral resolution improvement.

It is also within the scope of the eighth embodiment to subtract a fraction or multiple of the destructive output from the constructive output and thereby avoid negative values featuring in the final image while still improving the resolution.

A detailed mathematical analysis of how subtracting the destructive output from the constructive output yields a single output with an improved resolution is discussed in an accompanying paper "Interferometric resolution improvement for confocal microscopes" set out in an Appendix A hereto, which paper comprises an integral part of the present application. Moreover, nothing in the accompanying paper should be construed as limiting the scope of the present invention. In particular, each feature of the embodiments described in the accompanying paper may be considered alone or in combination with any of the other features, either in the paper, or in combination with any of the embodiments described in this patent specification.

Figure 14:
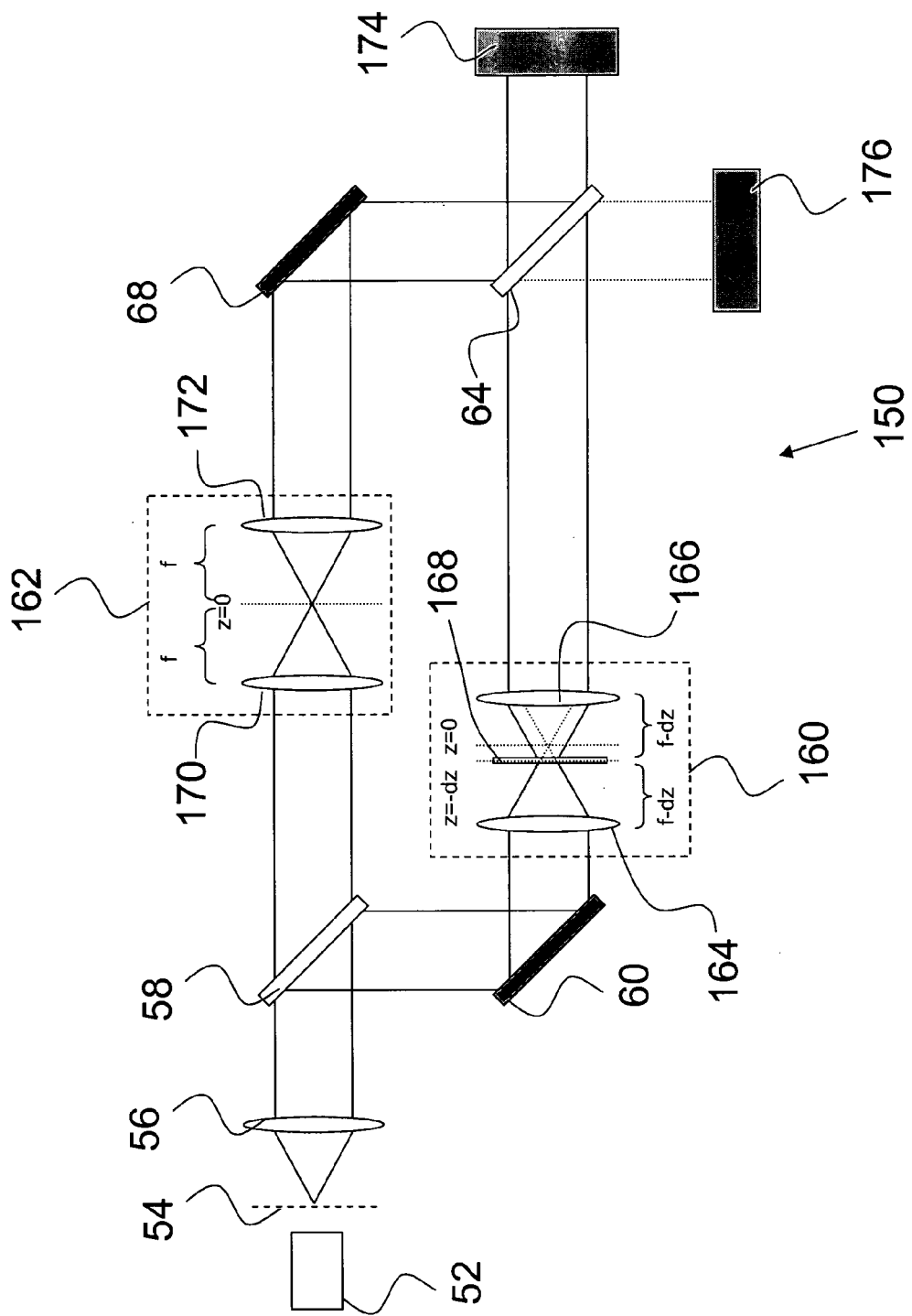
FIG. 14 is a diagram illustrating a ninth embodiment of the present invention.

A ninth embodiment of the present invention will now be described with reference to FIG. 14 and FIG. 15.

In particular, within the ninth embodiment an interferometer 150 is provided, based upon a modified version of the interferometer arrangement of the first embodiment. Within the interferometer arrangement 150, as described previously with respect to the first embodiment, an emitted light beam from the image generation system 52 is transformed from a point in the image plane 54 into a parallel beam by lens L1 (56). Here in the ninth embodiment, the parallel beam is split by beam splitter BS1 (58), resulting in a first emitted beam which is then reflected via mirror M1 (60) through a phase plate arrangement 160 onto the second beam splitter BS2 (64). The phase plate arrangement 160 comprises a first lens 164, a second lens 166 and a phase plate 168 positioned between the two lenses.

A second emitted beam is also output from beam splitter BS1 (58), which passes through an image inversion system 162, and then is reflected by mirror M2 (68) onto the second beam splitter BS2 (64). The image inversion system 162 comprises a first lens 170 and a second lens 172. Although not shown, a phase/dispersion compensation element should be included in the path of either the first or second emitted beams, to ensure that the optical path length is the same in each path, as described previously in respect of the previous embodiments. At the second beam splitter BS2 (64) the beam from the image inversion system 162 and the beam from the phase plate arrangement 160 are interferometrically recombined (coherently added/subtracted) and the resulting two output beams of the BS2 (64) are then received by respective integrating detectors 174 and 176.

Figure 15:
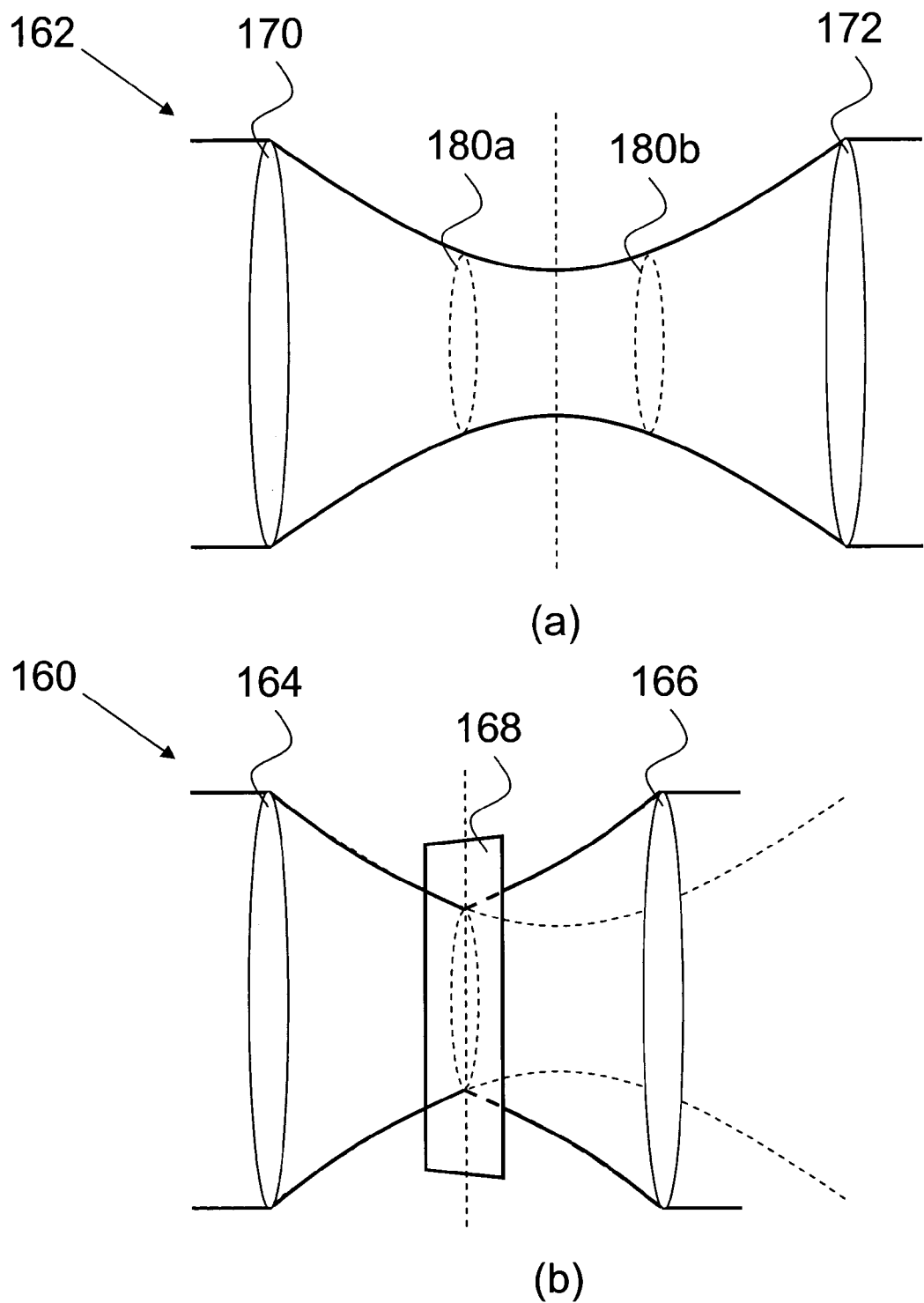
FIG. 15 is a diagram illustrating detail of the image inversion system and phase plate arrangement of the ninth embodiment of the present invention.

FIG. 15(*a*) represents a schematic view of a beam passing through the lenses 170 and 172 of the image inversion system 162 and, FIG. 15(*b*) represents a schematic view of a beam passing though the lens 164, the phase plate 168 and the lens 166 of the phase plate arrangement 160. The phase plate 168 is any device that can alter the phase of a wave front in a desired way. It introduces a phase difference of a given value p(x,y) at points (x,y) where x and y are usually the coordinates perpendicular to the optical axis, and (0,0) lies on the optical axis. As seen more particularly on FIG. 15(*a*), a beam travelling through the image inversion system 162 is distorted substantially parabolically between the first lens 170 and the second lens 172. Two positions 180*a* and 180*b* in the beam path of FIG. 15(*a*) are highlighted and both positions are located either side of, and equidistant from, a central position between lenses 170 and 172.

As seen in FIG. 15(*b*), positioning the phase plate 168 between the first lens 164 and the second lens 166 of the phase plate arrangement 160, at the position 180*a* distorts the beam and in effect removes a section of its path in comparison to the beam of FIG. 15(*a*). The removed section corresponds to a part of the beam path between the positions 180*a* and 180*b*. Furthermore, in FIG. 15(*b*) the path of the beam after the phase plate 168 corresponds to the path of the beam in FIG. 15(*a*) after the position 180*b*. Therefore, the effect of the phase plate 168 is to match the phase of the beam leaving the second lens 166 of the phase plate arrangement 160 to the phase of the beam leaving the second lens 172 of the image inversion system 162. This is the case even though the distance between the first and second lenses (164, 166) of the phase plate arrangement 160 is less than the distance between the first and second lenses (170, 172) of the image inverter system 162.

Ideally, the phase plate 168 only alters the phases and not the local field strengths or intensities of the beam. However, if a known reduction in intensity can not be avoided, this could preferably be compensated by intensity reductions in the image inversion system. In the ninth embodiment a phase plate can be realised by a Fresnel-lens, a curved mirror, a digital phase-altering device such as a spatial light modulator, a gradient index material medium (GRIN lens), or even regular lenses.

In operation, the first lens 170 of the image inversion system 162 and the first lens 164 of the phase plate arrangement 160 have a focal length equal to f and act to focus each respective beam upon which they act to create an image plane at a position a distance of f from the lens (this position being referred to as z=0). The second lens 172 of the image inversion system 162 also has a focal length f and is placed a distance of 2f after the first lens 170, thereby creating a image inversion system. In the phase plate arrangement 160 however, a thin phase plate 168 is introduced at a distance −dz before z=0, or in other words a distance of −dz before the image plane created by the first lens 164. If a point-like light source is located in the origin of the sample space (sample space coordinates (0,0,0) meaning on the optical axis of the system as well as being in focus in the image plane 54), the phase plate 168 will operate on a slice of the coherent point spread function at −dz, or expressed differently, PSF(x,y,−dz). Thus, the phase plate 168 is defined to be:

$$PP(x,y)=PSF(x,y,+dz)/PSF(x,y,-dz).$$

It is noted that as PSF(x,y,+dz) and PSF(x,y,−dz) are complex conjugates, their fraction really only contains phase terms. The phase plate 168 therefore transforms the above mentioned slice into:

$$PSF(x,y,-dz)=PP(x,y)*PSF(x,y,-dz)=PSF(x,y,+dz).$$

Wherein this expression can be seen as a z-translation of this particular coherent point spread function slice by 2dz.

The second lens 166 of the phase plate arrangement 160 also has a focal length equal to f and the second lens 166 is placed at a distance of 2(f−dz) after the first lens 164. However, as described above the phase plate 168 alters the coherent wave-front PSF(x,y,−dz) at z=−dz into the wavefront PSF(x,y,−dz) at z=+dz. For an on-axis in-focus emitter, the two wave-fronts recombined at the second beam-splitter 64 will be identical, therefore leading to perfect constructive/destructive interference in the respective outputs.

However, perfect interference will only be realised for a light source at the origin of the imaging system (coordinates (0,0,0) in sample space). If the light source is placed at a position away from the origin at (X0,Y0,Z0), the combination of lenses 170 and 172 in the image inversion system will still operate as an image inversion system. It is noted that the coordinates X0, Y0 and Z0 denote the source's position in sample space, whereas X0', Y0' and Z0' denote the source's position in image space. But in the phase plate arrangement 160, the phase plate 168 will operate on a different, displaced slice of the point spread function, PSF(x−X0',y−Y0',−dz−Z0'). In this case, the phase plate arrangement 160 will not work as an image inversion system, and the wave-fronts superimposed on the second beam-splitter 64 will no longer match, resulting in a decrease in signal in the constructive output and an increase in signal in the destructive output.

More specifically, the whole apparatus 150 can be thought of as interfering at the second beam splitter 64:

$$PSFA=PSF(x-X0',y-Y0',-Z0'+dz)$$

with:

$$PSFB=PSF(x-X0,y-Y0,-Z0'-dz)*PP(x,y).$$

Only for X0=Y0=Z0=0 (i.e. for a light source at the origin) will:

$$PSFB=PSF(x,y,-dz)*PSF(x,y,+dz)/PSF(x,y,-dz)=\\PSF(x,y,+dz)=PSFA,$$

and therefore, lead to perfect constructive/destructive interference. For all other values of X0,Y0,Z0 the constructive signal will be decreased and the destructive signal will be increased. This leads to an increase in resolution in all three directions, x, y and z.

Furthermore, combining this effect with localized illumination will further improve the resolution. It is noted that first simulations indicate the possibility of axial resolution of 560 nm full width at half maximum (FWHM) in the constructive output. The difference in constructive and destructive signal has an axial FWHM of as low as 420 nm. These results were calculated for a confocal system without a pinhole. Excitation wavelength was 488 nm, emission 525 nm, NA=1.2, refractive index 1.33. Introducing pinholes can further increase the resolution. However, the ability of achieving this resolution without the use of pinholes or with moderately open pinholes is extremely attractive, as the detection efficiency will be considerably higher than for a regular confocal microscope with a similar resolution.

A tenth embodiment of the present invention will now be described with reference to FIG. 16.

In particular, within the tenth embodiment a slightly rearranged and modified version of the apparatus described previously with respect to the third embodiment is employed with a microscope 180 as the image generation system 52.

More particularly, in the tenth embodiment an emitted light beam from the microscope 180 is provided to an interferometer arrangement 182. In the interferometer arrangement 182, as described with reference to the third embodiment, the emitted light beam leaving the microscope 180 and entering the interferometer 182 is split into a first emitted beam and a second emitted beam at the beam splitter 58. Here in the tenth embodiment, the first emitted beam passes straight through the beam splitter 58 onto a first focussing lens L1 (184) and the second emitted beam is reflected by the beam splitter 58 onto a second focussing lens L2 (186). The focal length for L1 (184), f1, and the focal length for L2 (186), f2, may be identical but it is also within the scope of this embodiment that they are different.

A planar mirror M1 (190) is located a distance f1 from L1, in the image plane (P1) of the lens L1 (184). Additionally, a second mirror M2 (192) is placed behind the lens L2 (186), however, this mirror is not placed in the image plane (P2) of the lens L2 (186), but instead a distance (d2) behind P2.

When the above-mentioned components are arranged as described above and a point source S1 (188) is positioned in the focus F of the microscope 180, a focussed image of the source S1 (188) is created in both the image plane (P1) of the lens L1 (184) and the image plane (P2) of the lens L2 (186). The light originating from the source S1 (188) will have a planar wave front at the beam waist in P1, and the planar mirror M1 (190) will reflect this light back onto itself so that it will retrace its own path backwards towards the beam splitter 58. However, behind P2, light originating from the source S1 (188) will have a convex wave front. The second mirror M2 (192) is not planar, and has a curvature matching or approximating the curvature of the convex wave front at the position of mirror M2 (192), or in other words at a distance of d2 behind the image plane P2. Positioning the curved mirror M2 (192) in this way will lead to the incoming light also being reflected onto itself. The reflection created by M2 (192) will, therefore, also retrace its own path backwards. Therefore, the two wave fronts reaching the beam splitter 58 from the mirror M1 (190) and the mirror M2 (192) are substantially identical. Possible differences in absolute pathlengths can be compensated by adjustments to the distance between the beam splitter (58) and the lenses (184 or 186) respectively. Alternatively, a phase/dispersion compensation element may be included in the beam path between the beam splitter 58 and the lens L1 (184) to ensure that the optical path lengths of the first and second emitted beams is the same, as described previously in respect of the previous embodiments.

At the beam splitter 58, the beam from mirror M1 (190) and the beam from mirror M2 (192) are interferometrically recombined to produce a first recombined output beam and a second recombined output beam at right angles to each other. Moreover, in the first output beam the wave forms from mirrors M1 (190) and M2 (192) constructively interfere, whereas the in the second output beam the wave forms destructively interfere. The first recombined output beam is directed from the beam splitter 58 towards a third lens L3 (194) which acts to image the beam onto an output image plane 196. The second recombined output beam is directed from the beam splitter 58 back towards the microscope 180. Where the apparatus 182 according to the tenth embodiment is used with a confocal imaging system, a spatially discriminating means such as a pinhole or the like, as discussed previously with respect to the first embodiment, can be located at the output image plane 196.

Figure 16:
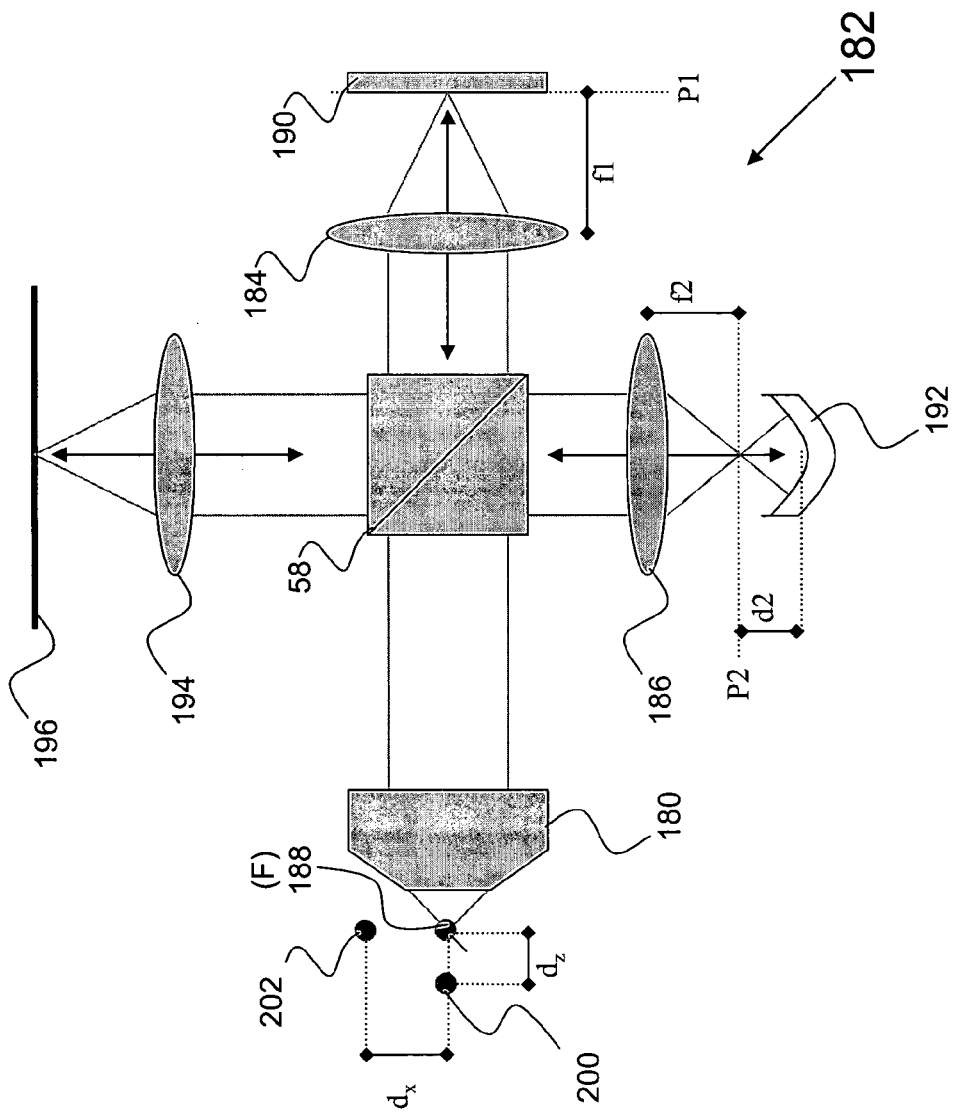
FIG. 16 is a diagram illustrating a tenth embodiment of the present invention.
Figure 18:
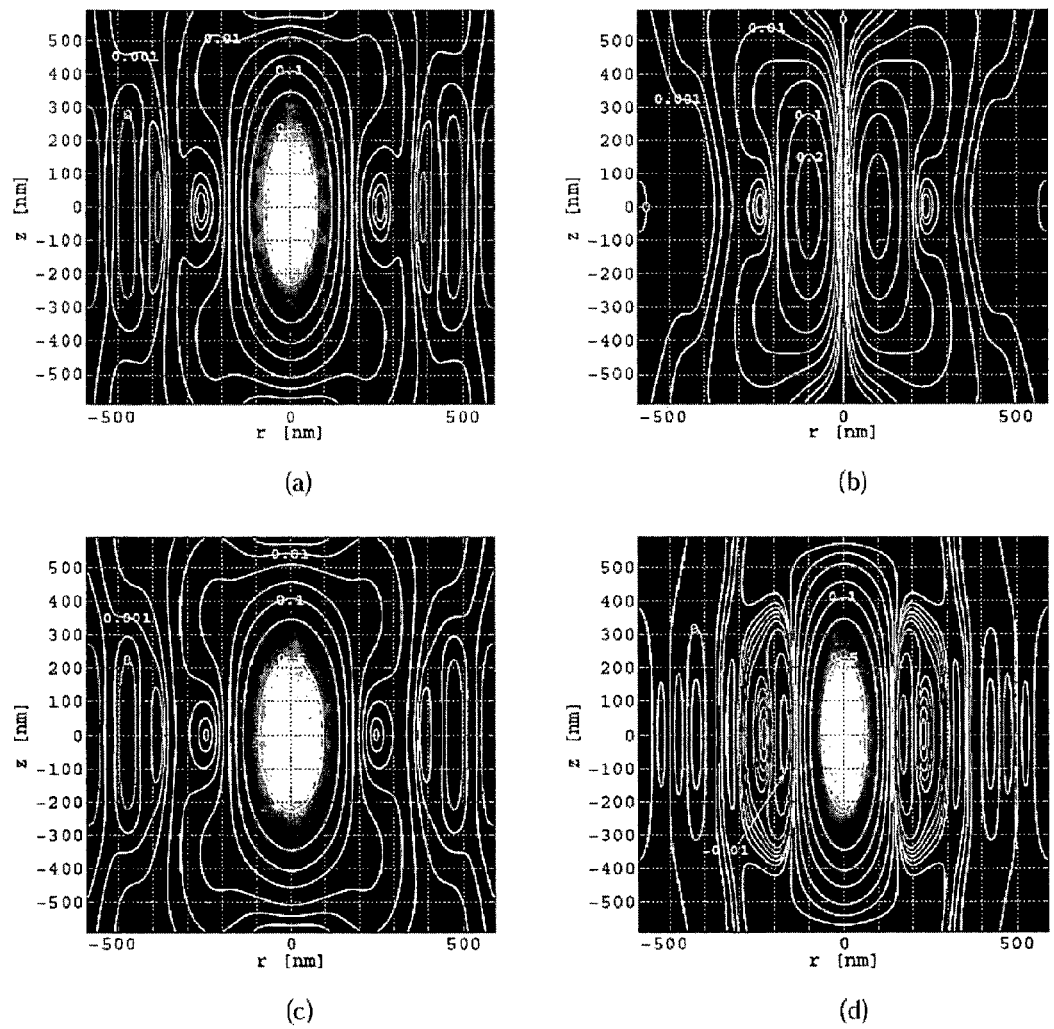
FIG. 18a is a graph of point spread functions for a constructive interferometer output.
FIG. 18b is a graph of point spread functions for a destructive interferometer output.
FIG. 18c is a graph of point spread functions for a confocal arrangement without an interferometer.
FIG. 18d is a graph of the difference between the interferometer outputs of FIG. 18a and FIG. 18b.
Figure 20:
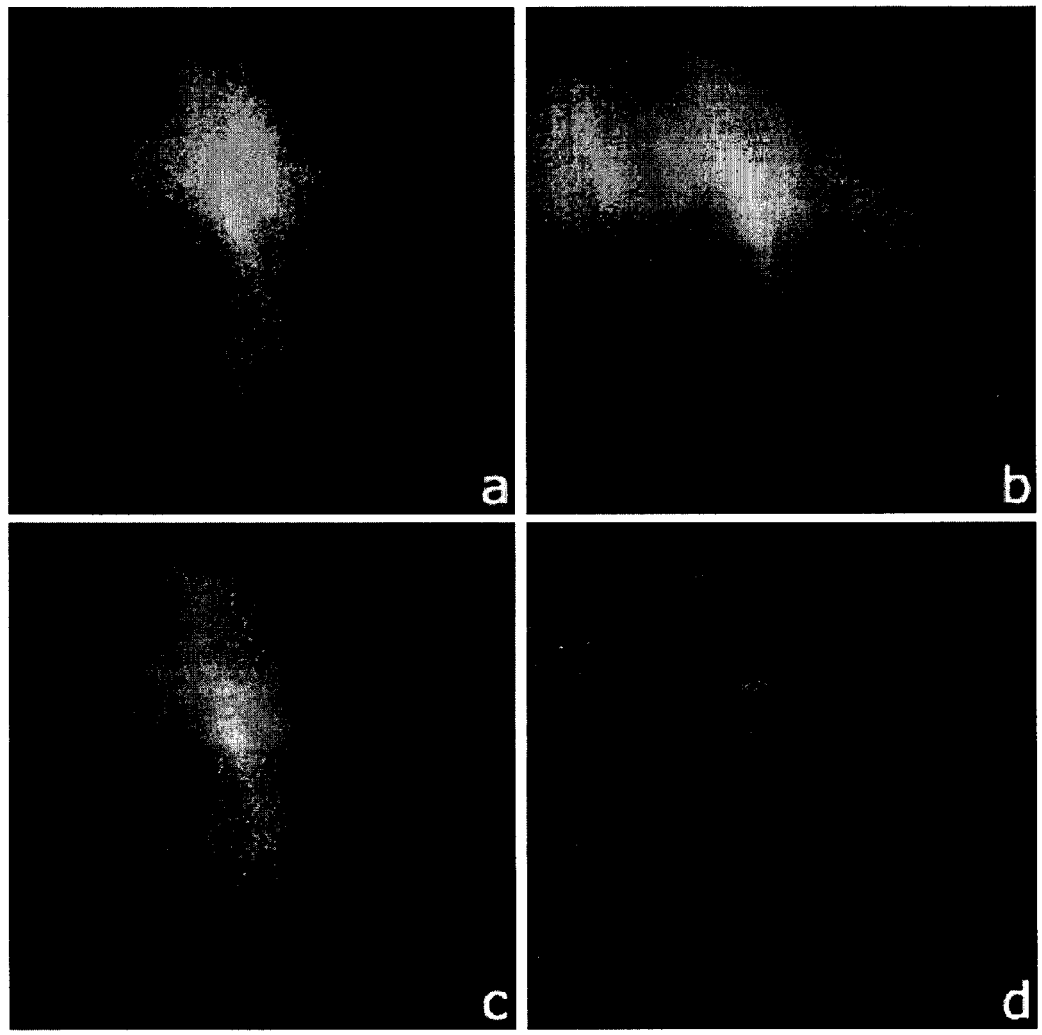
FIG. 20a is a constructive Simulated Extended Focus Image, created assuming scanning Bessel beam excitation.
FIG. 20b is a destructive Simulated Extended Focus Image, created assuming scanning Bessel beam excitation.
FIG. 20c is a non-interferometric integrating detection Simulated Extended Focus Image, created assuming scanning Bessel beam excitation.
FIG. 20d is an image showing the differences between the images of FIG. 20a and FIG. 20b.

In the interferometer 182 of FIG. 16, the second output beam is not easily accessible for detection, but can be made so by, for example, the use of a different type of interferometer or additional optical elements. This includes the use of polarization means to effectively separate the returning light.

Although light originating from the source S1 (188) at F will interfere constructively, light originating from an alternative source S2 (200) displaced by a distance $d_z$ axially (i.e. along the optical axis) from F will behave very differently in the interferometer arrangement 182. After reflection at mirrors M1 (190) and M2 (192) the two waves will no longer be identical and can therefore no longer interfere perfectly, neither constructively nor destructively. Therefore, light intensity of the first output beam will drop as it increases in the second beam, until for very large distances $d_z$ it reaches 50% in both channels. This change in light intensity leads to an improvement in axial resolution.

The above is also true for light originating from a source S3 (202) displaced laterally (i.e. perpendicular to the optical axis) by a distance $d_x$ from F, leading to an improved lateral resolution. Therefore, by virtue of combining these improvements in axial and lateral resolution, the tenth embodiment provides an output having improved resolution in all three directions, x, y, and z.

Various slight modifications may be made to the tenth embodiment to create variants. Firstly, lens L1 (184) may be left out so that the beam emitted from the beam splitter 58 travels directly to the mirror M1 (190) and is reflected straight back to the beam splitter 58. In this variant the arrangement would achieve a similar effect to the tenth embodiment. Secondly, in another variant, rather than the mirror M2 being positioned a distance d2 behind P2, the mirror M2 is positioned a distance d2 in front of P2. At this position, light originating from the source 51 (188) will have a concave wave front. In this variant the second mirror M2 (192) also has a curvature matching or approximating the curvature of the concave wave front at the position of M2 (192), or in other words at a distance of d2 in front of the image plane P2. As in the tenth embodiment, positioning the curved mirror M2 (192) in this way leads to the incoming light also being reflected onto itself. The reflection created by M2 (192), therefore, also retraces its own path backwards. Therefore, the two wave fronts reaching the beam splitter 58 from the mirror M1 (190) and the mirror M2 (192) are substantially identical, thus the arrangement of this other alternative embodiment achieves a similar effect to the tenth embodiment.

We have therefore described several embodiments of different interferometer arrangements which can be used to obtain the resolution enhancing effect identified by Sandeau and Giovannini and/or for optical sectioning. However, within embodiments of the invention interferometer apparatus arrangements are described which can accept an image generated from any image generation system of the prior art, such as a standard confocal microscope, or the like, and then apply the resolution enhancing effect to that image, to enhance the resolution thereof. Thus, as well as being integrated into complete systems, such as previously described in the second embodiment, the other embodiments of the invention may also be implemented as discrete add on arrangements, to be added on to existing image generation systems.

Moreover, whilst we have described the embodiments of the invention in the context of being used with a confocal microscope, the invention is not so limited, and more generally may be used with any appropriate image generation system where a resolution improvement is required. In the field of microscopy, however, as well as being used with one photon microscopy systems, the embodiments of the invention may also be used with two photon microscopes in addition. In this respect, the use of the embodiments of the invention with two photon microscopy provides an additional advantage, as the excitation point spread function is approximately 2× wider, in which case the resolution improvement achieved on the detection side as described contributes significantly more to the finally achieved image resolution.

Various modifications can be made to the above described embodiments to provide further embodiments. For example, within the above described embodiments we describe how the beam from the sample is split once into two beams, and then one of the beams is subject to a transformation, and the other beam is not transformed. However, what is actually important is that there is a relative transformation between the "transformed" beam, and the other beam. That is, in other embodiments of the invention both of the beams may be subject to a transformation, provided that after the transformations there is a relative difference between the two beams. Thus, for example, in a further embodiment both beams from the beam splitter may be subject to the same transformation, but then the "transformed" beam subject to a further transformation to introduce the relative difference required between the two beams. As discussed above, the difference in transformations is dependent on the position of a nominal image of a sample point in the image plane, wherein off-axis and/or out-of-focus parts of the image need to be provided with the relative difference, whereas on-axis and in-focus parts do not (so that they constructively interfere).

In view of this latter requirement, in further embodiments, both of the beams may be subject to a transformation, each respective transformation having the properties described previously, but further being different from the other transformation. For example, one transformation could be a rotation about the optical axis in a first direction, whereas the transformation in the other arm of the arrangement could be a rotation in an opposite direction. Provided the rotations did not bring the images to the same orientation (e.g. if a 180 degree rotation is used), then there would result a relative difference between the images in the two branches. Many other transformations could be applied which meet the same criteria.

Moreover, within the above described embodiments we have described a single splitting step into two beams. However, in further embodiments additional splitting steps could be provided to split the beam into more than two beams, such as four beams or eight beams, or even into odd numbers of beams e.g. three beams (by splitting the first beam, and then splitting only one of the resultant beams). The beams are then paired for recombination, and a transform or transforms applied to the beams to provide for a relative difference between any two beams which are to be recombined, the transform which is applied being dependent on the position of the emitter image in the emitter plane as described in detail previously.

Furthermore, whilst the embodiments we have described make use of optical components and are based on imaging systems which use light as the information carrier, the invention may be more broadly applied to any wave-based carrier system where interferometric techniques can be used. For example, electromagnetic radiation of different wavelengths outside the optical spectrum may be used as the information carrier, and the present invention is applicable to such other wavelengths. For instance, the present invention may be used with radar imaging systems. Similarly, acoustic waves may also be used as the image information carrier in other embodiments of the invention. The use of acoustic waves is already well known for imaging purposes, such as in sonar and ultrasound applications (e.g. in medical imaging), and the interferometric techniques used by the present invention can equally be applied thereto.

Especially interesting is the successive application of multiple interferometric transformations. In this sense the action of one pass through the interferometer discards unwanted light (which can still be measured or further transformed). A second pass through a similar interferometer may again discard unwanted waves (which can again be measured or further transformed). If waves from emitters at specific positions (e.g. along an axis of symmetry of the interferometers) will not be affected, this can equally be achieved for the multiple passes. In total the contrast or resolution of the system will be increased by application of several interferometers in succession. However, in some cases the waves leaving the first interferometer will gain a new symmetry, such that a successive passage through a similar interferometer will not help, as it would always transmit (or block) all the output waves from the first interferometer.

Nevertheless, the successive passage through interferometers of different type may be advantageous. For example, one path in the first interferometer could lead to a rotation by 180 degrees, whereas the second interferometer yields a rotation by 90 degrees, leading to further contrast improvement without sacrificing the wave throughput for the "ideal" centre wave. Whereas a single pass with integrating detection would lead to 50% even when the emitter is far off centre, the two-pass system already achieves a reduction of the background to 25%. Further applications with yet different angles can reduce this background further. It is also noted, that a different transformation (e.g. splitting the waves again and rotating around the axis by several different angles) in one path of an interferometer can have similar effects (e.g. with unequal splitting in the interferometer).

Figure 12:
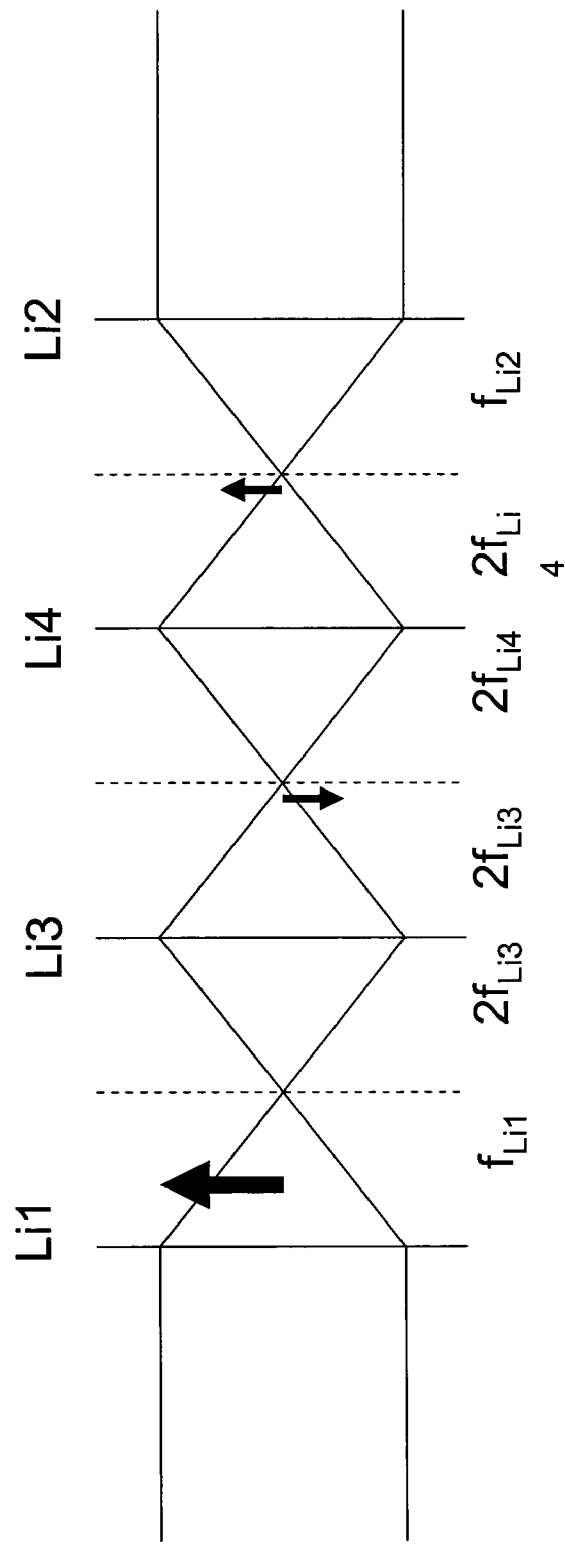
FIG. 12 is a diagram illustrating a seventh embodiment of the present invention.

An example is the multiple passage through interferometers based on embodiment six (FIG. 11) or embodiment seven (FIG. 12). Combinations of different types may be especially useful, for example using the second embodiment, FIG. 7 where the output of the first interferometer is followed by another interferometer with a transformer in one of its paths as shown in FIG. 11.

An alternative approach would be to use the same hardware to achieve multiple successive interferometric transformations. This can mean feeding one or multiple output waves back into the same setup under slightly different angles or at slightly different positions, but also time gating, or using polarisation characteristics of the waves to achieve the multiple passes through the setup are possible.

Further embodiments will be apparent to the skilled person, based on the present disclosure, any and all of such embodiments being intended to be encompassed by the appended claims.

The invention claimed is:

1. An apparatus for improving the resolution and/or sectioning ability of an imaging system, comprising:
at least one wave splitter for splitting an input wave carrying image information relating to an object to be imaged;
an interferometer arrangement arranged to receive the split input waves and which includes at least one wave transformer which produces a relative difference between the waves travelling through the interferometer arrangement by applying one or more transformations to one or more of said waves, wherein the one or more transformations include applying an image coordinate inversion in at least one axis, the interferometer arrangement being further arranged to output at least a first and a second output wave, wherein the first and second output waves are formed in the interferometer arrangement downstream of the one or more transformations being applied to the split input waves, the first output wave being produced by constructive interference of the split input waves and the second output wave being produced by destructive interference of the split input waves, wherein those parts of the first and second output waves which are due to an emitter located on-axis: i) constructively interfere in the first output wave; and ii) destructively interfere in the second output wave; and imaging means arranged produce at least a corresponding first image using the first output wave and a corresponding second image using the second output wave, and to produce a single output image in dependence on at least the first image and the second image;

wherein the change of the detected emissions from the emitter improves the resolution and/or sectioning ability of imaging of the object.

2. An apparatus according to claim 1, wherein the output wave or a focussing means downstream of the aforementioned interferometer will produce one or multiple image planes, whose position is downstream of the exit wave splitter of the interferometer or the additional focussing means respectively.

3. An apparatus according to claim 1, wherein the imaging means is in or close to an image plane of the plane of focus to be imaged.

4. An apparatus according to claim 1, wherein at least a partial representation of the second image is subtracted from the first image to produce the single output image.

5. An apparatus according to claim 1, wherein the wave transformer spatially displaces within the image at least part of the image located substantially off-axis.

6. An apparatus according to claim 1, wherein both of the split waves undergo transformations, the respective transformations being such as to provide the relative difference therebetween.

7. An apparatus according to claim 1, wherein the at least one wave transformer is arranged to apply an image coordinate inversion in at least two axes as said transformation.

8. An apparatus according to claim 1, wherein the at least one wave transformer changes the magnification of at least one axis (X, Y or defocus Z) in dependence on a nominal focus position of the input wave.

9. An apparatus according to claim 1, wherein the at least one wave transformer changes the in-plane or focus position non-linearly with defocus or off axis distance.

10. An apparatus according to claim 1, wherein the at least one wave transformer is arranged to apply an image rotation about an axis of symmetry as said transformation.

11. An apparatus according to claim 1, wherein the at least one wave transformer is arranged to apply an image reflection about an axis of symmetry as said transformation.

12. An apparatus according to claim 1, wherein the at least one wave transformer changes the phase with off-axis distance as said transformation.

13. An apparatus according to claim 1, wherein the wave splitter also acts as a wave combiner as part of said interferometer arrangement.

14. An apparatus according to claim 1, wherein the wave splitter and the at least one wave transformer are formed from the same component.

15. An apparatus according to claim 1, wherein the input wave is a light wave.

16. An apparatus according to claim 1, wherein the imaging system is a confocal imaging system.

17. An apparatus according to claim 1, wherein the imaging system is a microscope.

18. An apparatus according to claim 1, wherein the interferometer arrangement is further arranged to apply two or more successive transformations to one or more of the wave paths through the interferometer arrangement.

19. An apparatus according to claim 1, and further comprising one or more further successive wave splitters and interferometer arrangements, the arrangement being such that the output wave from a previous interferometer arrangement is used as the input wave to the successive wave splitter and interferometer arrangement, whereby said resolution or sectioning ability is further improved.

20. An apparatus according to claim 1, wherein the interferometer arrangement is further arranged to cause at least a subset of waves travelling though the interferometer arrangement to travel though at least part of the interferometer arrangement two or more times, whereby resolution and/or sectioning ability is further improved.

21. An apparatus according to claim 13, wherein the at least one wave transformer comprises a wave lens arranged to provide a focussing effect to the wave and a wave reflector for reflecting the wave, the arrangement being such that the wave lens focuses the wave onto the wave reflector, which reflects the focussed wave back to the wave lens.

22. An apparatus according to claim 13, wherein the at least one wave transformer comprises a plurality of substantially planar wave reflectors arranged substantially orthogonal to each other, the arrangement being such as to reflect an incident wave thereon back in the incident direction.

23. An apparatus according to claim 13, wherein the at least one wave transformer comprises a lens arranged to provide a focussing effect to the wave and a curved wave reflector for reflecting the wave, the arrangement being such that the lens focuses the wave at a distance in-front of the wave reflector, and the wave reflector reflects the unfocussed wave back to the lens.

24. An apparatus according to claim 13, wherein the at least one wave transformer comprises a lens arranged to provide a focussing effect to the wave and a curved wave reflector for reflecting the wave, the arrangement being such that the lens focuses the wave a distance behind the wave reflector, and the wave reflector reflects the unfocussed wave back to the lens.

25. An apparatus according to claim 23, wherein the curvature of the wave reflector corresponds to the curvature of the unfocussed wave at the point of reflection.

26. An apparatus according to claim 14, wherein the interferometer arrangement includes a wave combiner to interferometrically recombine the waves travelling through the interferometer, wherein the wave combiner comprises a prism arranged to direct, through wave refraction, the waves at an angle to each other whereby the waves interferometrically recombine.

27. An apparatus according to claim 26, wherein the wave splitter and the wave combiner are formed from a beam splitter contained within said prism.

28. An apparatus according to claim 16, where the apparatus further comprises a spatially discriminating means arranged to receive the output wave, and to spatially discriminate at least a part of said wave.

29. An apparatus according to claim 18, wherein the successive transformations are different transformations.

30. A method for improving the resolution and/or sectioning ability of an imaging system, comprising the steps:—
   a) splitting an input wave carrying information relating to an object to be imaged into at least two waves;
   b) applying one or more transformations to one or more of said waves so as to produces a relative difference between the waves, wherein the one or more transformations include an image coordinate inversion in at least one axis;
   c) interferometrically recombining the waves to provide at least a first and a second output wave, wherein the first output wave is produced by constructive interferometric recombination and the second output wave is produced by destructive interferometric recombination;
   wherein those parts of the first and second output waves which are due to an emitter located on-axis: i) constructively interfere in the first output wave; and ii) destructively interfere in the second output wave; and
   d) capturing the information relating to the object carried in the at least first and second output waves to produce an image, wherein at least a corresponding first image is produced using the first output wave and at least a corresponding second image is produced using the second output wave, and a single output image is produced in dependence on at least the first image and the second image;
   wherein the change of the detected emissions from the emitter improves the resolution and/or sectioning ability of imaging of the object.

31. A method according to claim 30, and further comprising producing one or multiple image planes at a position downstream of the interferometric recombination.

32. A method according to claim 30, wherein the output wave is captured in or close to an image plane of the plane of focus to be imaged.

33. A method according to claim 30, wherein the imaging step d) is arranged such that the single output image is produced by subtracting at least a fraction or multiple of the second image from the first image.

34. A method according to claim 30, wherein the transforming step spatially displaces within the image at least part of the image located substantially off-axis.

35. A method according to claim 30, wherein both of the split waves undergo transformations, the respective transformations being such as to provide the relative difference therebetween.

36. A method according to claim 30 wherein the transforming step is arranged to apply an image coordinate inversion in at least two axes as said transformation.

37. A method according to claim 30, wherein the transforming step changes the magnification of at least one axis (X, Y or defocus Z) in dependence on the nominal focus position of an input wave.

38. A method according to claim 30, wherein the transforming step changes the in-plane or focus position non-linearly with defocus or off-axis distance.

39. A method according to claim 30, wherein the transforming step is arranged to apply an image rotation about an axis of symmetry as said transformation.

40. A method according to claim 30, wherein the transforming step is arranged to apply an image reflection about an axis of symmetry as said transformation.

41. A method according to claim 30, wherein the transforming step changes the phase with off-axis distance as said transformation.

42. A method according to claim 30, wherein the transforming step comprises focussing the first split wave to a focus point, and reflecting the focus point back in the incident direction.

43. A method according to claim 30, wherein the transforming step comprises reflecting the first split wave from a plurality of wave reflecting surfaces arranged substantially orthogonal to each other.

44. A method according to claim 30, wherein the transforming step comprises focussing at least one of the split waves to a focus point, and reflecting the wave back in the incident direction at a distance in-front of the focus point using a curved wave reflector.

45. A method according to claim 30, wherein the transforming step comprises focussing at least one of the first split waves to a focus point, and reflecting the wave back in the incident direction at a distance behind the focus point using a curved wave reflector.

46. A method according to claim 30, wherein the combining comprises directing the second split wave and the transformed wave together at an angle, whereby the transformed wave and the second wave interferometrically recombine.

47. A method according to claim 30, wherein the input wave is a light wave.

48. A method according to claim 30, wherein the imaging system is a confocal imaging system, the method further comprising spatially discriminating the output wave.

49. A method according to claim 30, wherein the imaging system is a microscope.

50. A method according to claim 30, where the interferometric information in the image plane is used for the precise localisation of the position of one or multiple particle positions.

51. A method according to claim 30, and further arranged to apply two or more successive transformations to one or more of the split waves.

52. A method according to claim 30, and further comprising successively repeating steps a), b), and c) one or more times, applying the output wave from a previous iteration as the input wave.

53. A method according to claim 44, wherein the curvature of the wave reflector corresponds to the curvature of the defocussed wave at the point of reflection.

54. A method according to claim 51, wherein the successive transformations are different transformations.

55. A method according to claim 51, wherein the repetition of steps a) to c) reuses hardware that was used in previous steps.

* * * * *